US010460227B2

(12) United States Patent
Sanghavi et al.

(10) Patent No.: US 10,460,227 B2
(45) Date of Patent: Oct. 29, 2019

(54) VIRTUAL ASSISTANT IN A COMMUNICATION SESSION

(71) Applicant: Apple Inc., Cupertino, CA (US)

(72) Inventors: Mehul K. Sanghavi, Sunnyvale, CA (US); Jeffrey P. Schwerdtfeger, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 821 days.

(21) Appl. No.: 14/713,410

(22) Filed: May 15, 2015

(65) Prior Publication Data

US 2016/0335532 A1 Nov. 17, 2016

(51) Int. Cl.
*G06N 3/00* (2006.01)
*H04L 12/58* (2006.01)
*G06F 17/27* (2006.01)
*G06Q 10/10* (2012.01)

(52) U.S. Cl.
CPC ........... *G06N 3/006* (2013.01); *G06F 17/279* (2013.01); *G06F 17/2785* (2013.01); *G06Q 10/10* (2013.01); *H04L 51/02* (2013.01); *H04L 51/12* (2013.01)

(58) Field of Classification Search
None
See application file for complete search history.

(56) References Cited

U.S. PATENT DOCUMENTS

| 9,338,493 | B2* | 5/2016 | Van Os | G10L 15/22 |
| 9,659,298 | B2* | 5/2017 | Lynch | G06Q 30/00 |
| 2011/0202594 | A1* | 8/2011 | Ricci | H04M 3/4931 709/203 |
| 2012/0245944 | A1* | 9/2012 | Gruber | G06F 17/3087 704/270.1 |

(Continued)

FOREIGN PATENT DOCUMENTS

| JP | 2012-502377 | 1/2012 |
| JP | 2013-517566 | 5/2013 |

(Continued)

OTHER PUBLICATIONS

International Search Report, dated Jun. 27, 2016, received in International Patent Application No. PCT/US2016/032763, which corresponds with U.S. Appl. No. 14/713,410, 13 pages.

(Continued)

*Primary Examiner* — Paulinho E Smith
(74) *Attorney, Agent, or Firm* — Dentons US LLP

(57) ABSTRACT

Disclosed are systems, methods, and non-transitory computer-readable storage media for utilizing a virtual assistant as part of a communication session. One or more of the participant users can select to utilize a virtual assistant to assist the participant users with tasks during the communication session. A user can use a communication application to enter a message directed to the virtual assistant. The virtual assistant can analyze the entered message and determine that the message was directed to the virtual assistant rather than to the other participants of the communication (Continued)

session. As a result, the message will not be transmitted to the other participants of the communication session and the virtual assistant will assist the user with the identified task. A virtual assistant can assist a user with a variety of different tasks.

21 Claims, 19 Drawing Sheets

(56) References Cited

U.S. PATENT DOCUMENTS

| | | | | |
|---|---|---|---|---|
| 2014/0006955 | A1* | 1/2014 | Greenzeiger | G06F 11/3006 |
| | | | | 715/733 |
| 2014/0164476 | A1 | 6/2014 | Thomson | |
| 2014/0164532 | A1* | 6/2014 | Lynch | H04L 12/1818 |
| | | | | 709/206 |
| 2014/0164533 | A1* | 6/2014 | Lynch | H04L 12/1822 |
| | | | | 709/206 |
| 2014/0164953 | A1 | 6/2014 | Lynch et al. | |
| 2014/0278343 | A1* | 9/2014 | Tran | G06F 17/2785 |
| | | | | 704/2 |
| 2014/0297284 | A1* | 10/2014 | Gruber | G10L 15/18 |
| | | | | 704/257 |
| 2015/0066817 | A1* | 3/2015 | Slayton | G06N 5/04 |
| | | | | 706/11 |
| 2015/0088514 | A1* | 3/2015 | Typrin | G06F 3/167 |
| | | | | 704/249 |
| 2015/0095268 | A1* | 4/2015 | Greenzeiger | G06Q 10/00 |
| | | | | 706/11 |
| 2016/0335532 | A1* | 11/2016 | Sanghavi | G06N 3/006 |
| 2016/0360039 | A1* | 12/2016 | Sanghavi | H04M 3/5183 |
| 2017/0346949 | A1* | 11/2017 | Sanghavi | H04M 3/5183 |

FOREIGN PATENT DOCUMENTS

| | | | |
|---|---|---|---|
| WO | WO 2012/063260 A2 | 5/2012 | |
| WO | WO-2012063260 A3 * | 10/2012 | ............ G06Q 10/10 |
| WO | WO-2016187149 A1 * | 11/2016 | ............ G06N 3/006 |

OTHER PUBLICATIONS

Office Action, dated Nov. 15, 2018, recieved in Australian Patent Application No. 2016265837, which corresponds with U.S. Appl. No. 14/713,410, 3 pages.

Office Action, dated Dec. 3, 2018, received in Japanese Patent Application No. 2017553158, which corresponds with U.S. Appl. No. 14/713,410, 7 pages.

Notice of Acceptance, dated May 24, 2019, received in Australian Patent Application No. 2016265837, which corresponds with U.S. Appl. No. 14/713,410, 3 pages.

Notice of Allowance, dated Jun. 14, 2019, received in Japanese Patent Application No. 2017553158, which corresponds with U.S. Appl. No. 14/713,410, 5 pages.

* cited by examiner

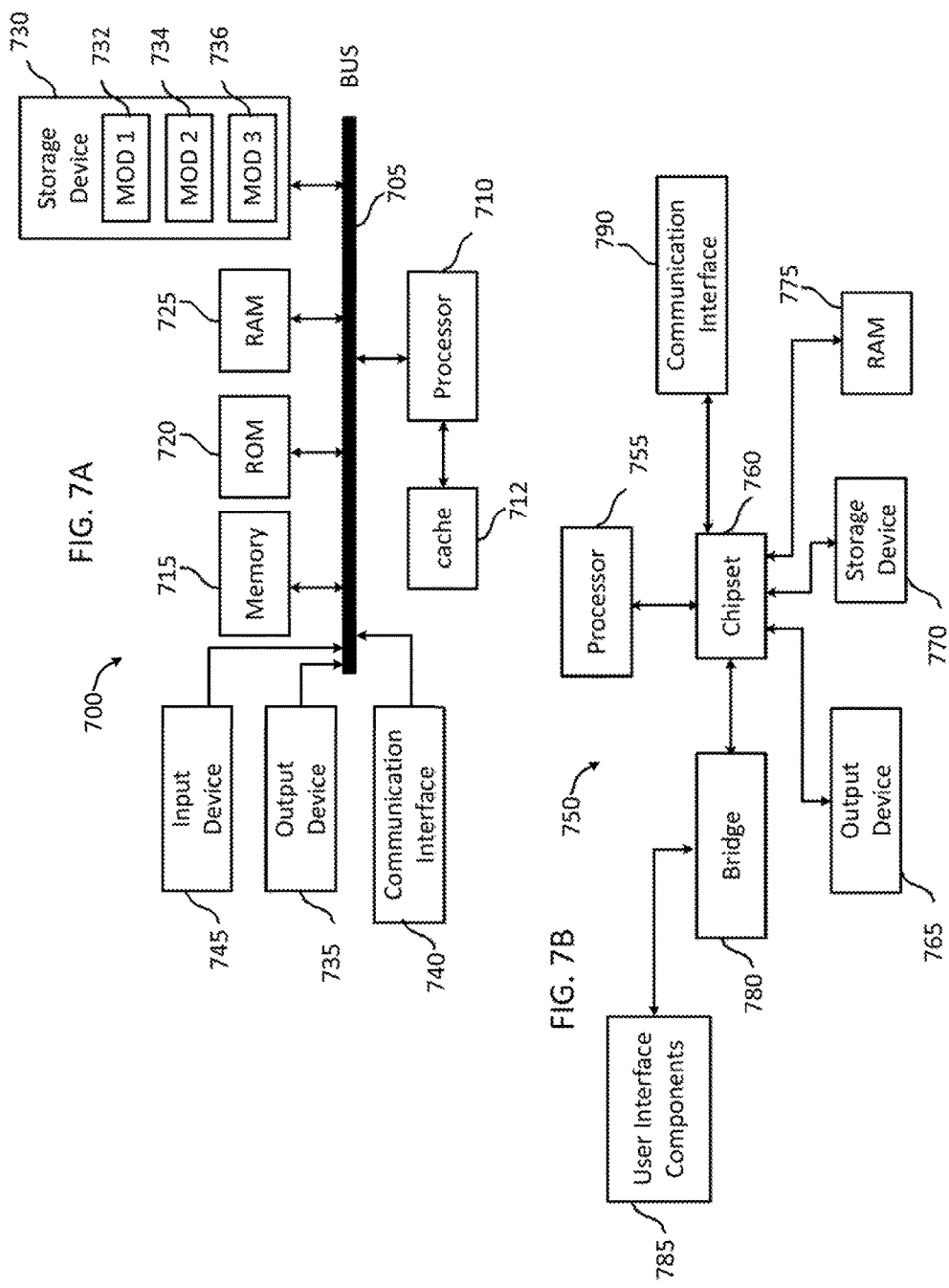

VIRTUAL ASSISTANT IN A COMMUNICATION SESSION

TECHNICAL FIELD

The present technology pertains to communication sessions between groups of users, and more specifically pertains to utilizing a virtual assistant to assist one or more users perform tasks during a communication session.

BACKGROUND

Current computing devices can include functionality that enables users to communicate with each other by transmitting and receiving messages. For example, many computing devices include text and/or instant messaging functionality that enable users of the computing devices to transmit text, images, sounds, etc., to the client devices of one or more other users. Users can use this functionality to have conversations, make plans and/or perform any other number of tasks.

While current systems enable users to communicate and perform tasks, users are required to manually perform the tasks. For example, a group of users attempting to schedule lunch needs to determine an available day and time that works for each member of the group. This can require each user to check their calendar and share available times with other users. Likewise, a group of users attempting to perform a financial transaction needs to determine a payment method for performing the transaction. This can require each user to determine the payment methods available to the individual user and then share this data amongst the other members of the group. Accordingly, improvements are needed.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for utilizing a virtual assistant as part of a communication session. A communication session can one or more communications transmitted amongst a group of participant users using a communication application. For example, a communication session can be a conversation between multiple users using a text and/or instant messaging application such as iMessage® available by Apple Inc., of Cupertino, Calif.

One or more of the participant users can select to utilize a virtual assistant to assist the participant users with tasks during the communication session. A virtual assistant can be an application, module, software, etc., capable of analyzing messages included in the communication session to identify tasks and provide assistance with completing the identified tasks. For example, a virtual assistant can be an application such as Siri® available by Apple Inc., of Cupertino, Calif., that uses semantic analysis to analyze text, recognize terms and interpret the intended meaning.

A task can be any type of action that a virtual assistant can provide assistance with. For example, a task can include scheduling a meeting, performing a financial transaction, determining an estimated time of arrival, providing directions, providing weather information, alerting a user of relevant information, etc.

In some embodiments, a user can communicate with the virtual assistant as part of the communication session. For example, a user can use the communication application to enter a message directed to the virtual assistant. The virtual assistant can analyze the entered message and determine that the message was directed to the virtual assistant rather than to the other participants of the communication session. As a result, the message will not be transmitted to the other participants of the communication session and the virtual assistant will assist the user with the identified task.

A virtual assistant can assist a user with a variety of different tasks. For example, the virtual assistant can gather requested data for the user from one or more web servers, such as weather data, traffic data, etc. Further, the virtual assistant can coordinate performing a task amongst multiple participant users of a communication session. For example, to assist with scheduling a meeting amongst multiple participant users of a communication session, a virtual assistant can gather calendar information for each of the participant users and recommend one or more proposed times for the meeting. Alternatively, to assist with performing a financial transaction amongst multiple participant users of a communication session, a virtual assistant can determine the financial applications available and/or utilized by each of the participant users and recommend a financial application to perform the financial transaction.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 7A and 7B illustrate exemplary possible system embodiments.

DESCRIPTION

Figure 1:
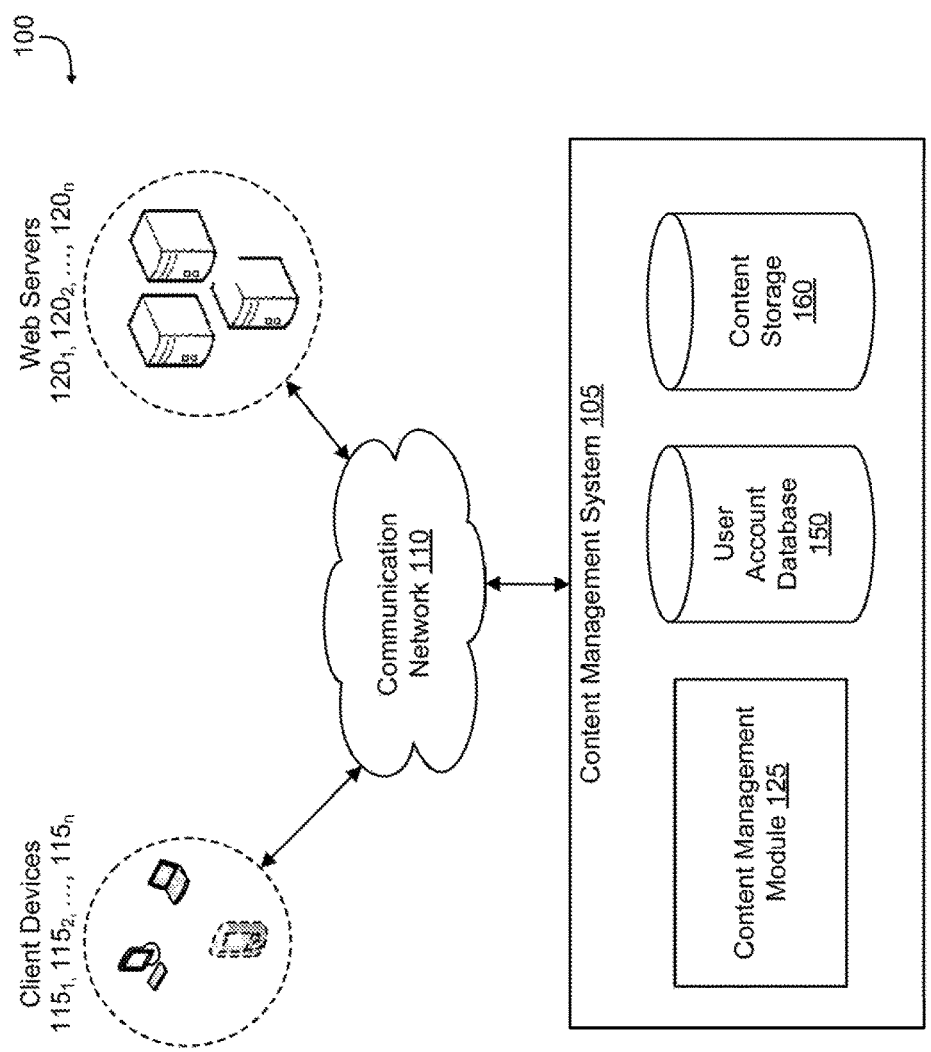
FIG. 1 shows an exemplary configuration of devices and a network in accordance with the invention.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for utilizing a virtual assistant as part of a communication session. A communication session can one or more communications transmitted amongst a group of participant users using a communication application. For example, a communication session can be a conversation between multiple users using a text and/or instant messaging application such as iMessage® available by Apple Inc., of Cupertino, Calif.

One or more of the participant users can select to utilize a virtual assistant to assist the participant users with tasks during the communication session. A virtual assistant can be an application, module, software, etc., capable of analyzing messages included in the communication session to identify tasks and provide assistance with completing the identified tasks. For example, a virtual assistant can be an application such as Siri® available by Apple Inc., of Cupertino, Calif., that uses semantic analysis to analyze text, recognize terms and interpret the intended meaning.

A task can be any type of action that a virtual assistant can provide assistance with. For example, a task can include scheduling a meeting, performing a financial transaction, determining an estimated time of arrival, providing directions, providing weather information, alerting a user of relevant information, etc.

In some embodiments, a user can communicate with the virtual assistant as part of the communication session. For example, a user can use the communication application to enter a message directed to the virtual assistant. The virtual assistant can analyze the entered message and determine that the message was directed to the virtual assistant rather than to the other participants of the communication session. As a result, the message will not be transmitted to the other participants of the communication session and the virtual assistant will assist the user with the identified task.

A virtual assistant can assist a user with a variety of different tasks. For example, the virtual assistant can gather requested data for the user from one or more web servers, such as weather data, traffic data, etc. Further, the virtual assistant can coordinate performing a task amongst multiple participant users of a communication session. For example, to assist with scheduling a meeting amongst multiple participant users of a communication session, a virtual assistant can gather calendar information for each of the participant users and recommend one or more proposed times for the meeting. Alternatively, to assist with performing a financial transaction amongst multiple participant users of a communication session, a virtual assistant can determine the financial applications available and/or utilized by each of the participant users and recommend a financial application to perform the financial transaction.

FIG. 1 illustrates an exemplary system configuration 100, wherein electronic devices communicate via a network for purposes of exchanging content and other data. As illustrated, multiple computing devices can be connected to communication network 110 and be configured to communicate with each other through use of communication network 110. Communication network 110 can be any type of network, including a local area network ("LAN"), such as an intranet, a wide area network ("WAN"), such as the internet, or any combination thereof. Further, communication network 110 can be a public network, a private network, or a combination thereof. Communication network 110 can also be implemented using any number of communication links associated with one or more service providers, including one or more wired communication links, one or more wireless communication links, or any combination thereof. Additionally, communication network 110 can be configured to support the transmission of data formatted using any number of protocols.

Multiple computing devices can be connected to communication network 110. A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 700 of FIGS. 7A and 7B.

To facilitate communication with other computing devices, a computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

In system 100, a user can communication with other users through use of client devices $115_1$, $115_2$, ..., $115_n$ (collectively "115") connected to communication network 110. Client devices 115 can be any type of computing device, such as a smart phone, tablet, personal computer, etc. Client devices 115 can include a communication application that enables a user of a client device $115_i$ to transmit and receive messages to and from other client devices 115. For example, a communication application can be a text and/or instant messaging application such as iMessage® available by Apple Inc., of Cupertino, Calif.

A user can also use client devices 115 to interact with web servers $120_k$, $120_2$, ..., $120_n$ (collectively "120") connected to communication network 110. Web servers 120 can be any type of computing device and be configured to maintain web data and provide the web data to requesting client devices 115. Web data can be data that can be rendered by client devices 115 to present a webpage, website, etc., to a requesting user. Web servers, 120 can support connections from a variety of different types of client devices 115, such as desktop computers; mobile computers; mobile communications devices (e.g. mobile phones, smart phones, tablets, etc.); smart televisions; set-top boxes; and/or any other network enabled computing devices.

System 100 can also include content management system 105. Content management system 105 can include one or more computing devices configured to manage content items for multiple user accounts. A content item can include any type of digital asset such as an application, audio file, text file, video file, etc.

Content management system 105 can support connections from a variety of different types of client devices 115, such as desktop computers; mobile computers; mobile communications devices (e.g. mobile phones, smart phones, tablets, etc.); smart televisions; set-top boxes; and/or any other network enabled computing devices. Client devices 115 can be of varying type, capabilities, operating systems, etc. Furthermore, content management system 105 can concurrently accept connections from and interact with multiple client devices 115.

A user can interact with content management system 105 via a client-side application installed on client device $115_i$. In some embodiments, the client-side application can include a content management system specific component. For example, the component can be a stand-alone application, one or more application plug-ins, and/or a browser extension. However, the user can also interact with content management system 105 via a third-party application, such as a web browser, that resides on client device $115_i$ and is configured to communicate with content management system 105. In either case, the client-side application can present a user interface (UI) for the user to interact with content management system 105. For example, the user can interact with content management system 105 via a client-side application integrated with the file system or via a webpage displayed using a web browser application.

Content management system 105 can be configured to manage content items and data for multiple user accounts. For example, content management system 105 can allow users to purchase, store and access content items, calendar data, contact data, etc. Furthermore, content management system 105 can make it possible for a user to access the stored data, such as content items, calendar data, contact data, etc., from multiple client devices 115. Accessing a content item can include receiving metadata describing the content item, streaming the content item from content management system 105 and/or downloading the content item to one of client devices 115.

To facilitate the various content management services, a user can create a user account with content management system 105. The account information for each created user account can be maintained in user account database 150. User account database 150 can store profile information for each user account, including a unique account identifier identifying the user account, personal information, username, password, email address, home address, credit card information, banking information, calendar data, contact data, etc. User account database 150 can also include account management information, such as content storage locations, security settings, personal configuration settings, client devices authorized to access the user account, etc.

A user account can be used to purchase, manage and store content items, such as digital data, documents, text files, audio files, video files, etc. For example, content management system 105 can provide an online content retailer where users can purchase a variety of content items. Further, in some embodiments, a user can upload content items from one of client devices 115 to content management system 105. The purchased and uploaded content items can be assigned to the user's account and then accessed by the user from any of client devices 115. For example, a content item identifier identifying each content item assigned to a user account can be stored in user account database 150 and associated with the corresponding user account. The content item identifier can be used to identify the content item as well as the location of the content item.

The content items can be stored in content storage 160. Content storage 160 can be a storage device, multiple storage devices, or a server. Alternatively, content storage 160 can be a cloud storage provider or network storage accessible via one or more communications networks. Content management system 105 can hide the complexity and details regarding storage of the content items from client devices 115 such that the location of the content items stored by content management system 105 is not known by client devices 115. Content management system 105 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various user accounts. The metadata for a content item can be stored as part of the content item or can be stored separately. In one variation, each content item stored in content storage 160 can be assigned a system-wide unique identifier.

Content management system 105 can include content management module 125 configured to manage and access each user account and the content items assigned to the user accounts. For example, content management module 125 can be configured to communicate with user account database 150 and content storage 160 to adjust privileges with respect to content items and otherwise manage content items.

Upon a user logging into their user account from one of client devices 115, content management module 125 can access the account information associated with the user account to identify the content items assigned to the user account, as well as account configuration data dictating presentation of the content items. Content management module 125 can then present and/or provide the content items to the user according to the account configuration data. For example, content management module 125 can access a user account to identify the content item identifiers assigned to the user account. The content item identifier can then be used to identify and locate the content items assigned to the user account, which can be presented according to the account configuration data.

Presenting the content items can include transmitting metadata describing the content items to client device $115_i$ that was used to access the user account. Client device $115_i$ can then use the received metadata to present the content items that the user account can access. For example, client device $115_i$ can present information identifying the content items available to the user account in a content item library. This can include presenting the title of the content items, images such as an album or book cover, description of the content item, etc.

Figure 2:
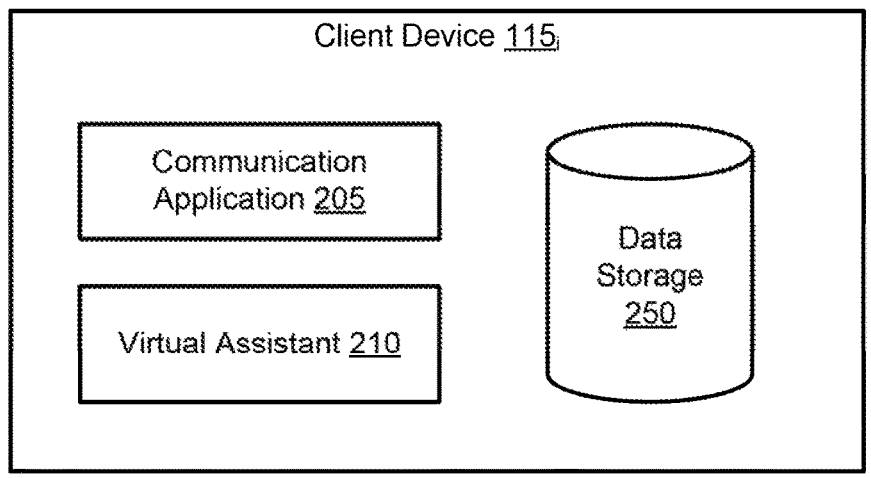
FIG. 2 shows an embodiment of a client device configured to enable a user to utilize a virtual assistant to perform tasks during a communication session.

FIG. 2 shows an embodiment of a client device $115_i$ configured to enable a user to utilize a virtual assistant to perform tasks during a communication session. FIG. 2 is described in view of the system shown in FIG. 1. As shown, client device 115, includes communication application 205. Communication application 205 can be any type of application configured to enable a user to send and receive data messages with one or more other client devices 115. A data message can be any type of data that can be transmitted from one computing device to another, such as text data, image data, sound data, etc. In some embodiments, communication application 205 can be a text and/or instant messaging application such as iMessage® available by Apple Inc., of Cupertino, Calif.

A user of client device 115, can use communication application 205 to conduct communication sessions with one or more groups of users. A communication session can be a group of messages transmitted between a group of users. For example, a communication session can be an instant messaging conversation between a group of two or more users.

Communication application 205 can provide a user with a messaging interface that enables the user to conduct a communication session. For example, the messaging interface can enable a user to create a new communication session by selecting one or more participant users and entering a message to be transmitted to the participant users. Further, the messaging interface can enable a user to view existing communication session and enter and transmit new messages as part of the existing communication sessions.

Client device $115_i$ can also include virtual assistant 210 configured to assist the user with tasks during a communication session. Virtual assistant 210 can be an application, module, software, etc., capable of analyzing messages included in a communication session to identify tasks and provide the user with assistance completing the identified tasks. For example, virtual assistant 210 can be an application such as Siri® available by Apple Inc., of Cupertino, Calif., that uses semantic analysis to analyze text, recognize terms and interpret the intended meaning.

A task can be any type of function, actions, etc., with which virtual assistant 210 can assist a user. For example, a task can be retrieving information, such as retrieving the current time, retrieving directions to a specified destination, retrieving sports scores, retrieving weather information, retrieving movie times, etc. Further a task can be coordinating and executing a transaction, such as scheduling a meeting, performing a financial transaction, purchasing tickets, etc.

Client device 115 can enable a user to select to utilize virtual assistant 210 in relation to one or more communication sessions. In some embodiments communication application 205 can be configured to enable a user to select to utilize virtual assistant 210 by adding virtual assistant 210 as a participant of the communication session. For example, the user can add a nickname associated with virtual assistant 210 as a participant to a communication session. In response, communication application 205 can communicate with virtual assistant 210 to utilize virtual assistant 210 to assist with the communication session.

Further, in some embodiments, communication application 205 can transmit a notification message to the other participants of the communication session indicating that the user of client device $115_i$ has selected to utilize virtual assistant 210. For example, communication application 205 can transmit a message as part of the communication session indicating that the user of client device $115_i$ is utilizing virtual assistant 210. As another example, the nickname associated with virtual assistant 210 can be presented as a member of the communication session, thereby indicating that at least one participant of the communication session is utilizing the virtual assistant. In some embodiments, the other participants can be prompted regarding whether they would like to utilize the virtual assistant in regards to the communication session.

To assist a user with a communication session, virtual assistant 210 can analyze messages included in the communication session to identify tasks. For example, virtual assistant 210 can use semantic analysis to recognize terms, sets of terms, etc., and interpret the intended meaning of the terms to identify one or more tasks that the user may need assistance with.

Virtual assistant 210 can use any type or techniques of semantic analysis known in the art to identify tasks with which virtual assistant 210 can assist the user. For example, in some embodiments, the semantic analysis can include the use of natural language processing (e.g., speech tagging, noun-phrase chunking, dependency and constituent parsing, etc.) to translate text into parsed text. Virtual assistant 210 can then analyze the parsed text to identify tasks. For example, virtual assistant 210 can use question and intent analysis, to detect user commands and/or actions from the text (e.g., schedule a meeting, set my alarm, etc.). Virtual assistant 210 can then analyze the resulting commands and/or actions to determine whether they are commands and/or actions with which virtual assistant can assist the user. For example, virtual assistant 210 can compare the tasks and/or actions to a list of known commands and/or actions with which virtual assistant 210 can assist the user. Any commands and/or actions identified by virtual assistant as being a command and/or action with which virtual assistant 210 can assist the user can be identified as a task by virtual assistant 210.

In some embodiments, virtual assistant 210 can analyze messages transmitted amongst the participant users of the communication session to identify tasks. This can include messages entered by a user of client device $115_i$ to be transmitted to the other participants as part of the communication session, as well as messages received from other users as part of the communication session.

Further, in some embodiments, virtual assistant 210 can determine whether a message provided by the user of client device $115_i$ was intended for the other participants of the communication session or intended for the virtual assistant. A user can use communication application 205 to enter a message intended for virtual assistant 210, such as a request or command that the virtual assistant assist the user with a specified task. For example, a user can enter a request such as "help us schedule a meeting" and virtual assistant can determine that the message was intended for virtual assistant 210. Alternatively, in some embodiments, a user can address messages intended for the virtual assistant by using a nickname for the personal assistant. For example, the user can enter a messages such as "Assistant, help us schedule a meeting." Virtual assistant 210 can determine that the message was intended for the virtual assistant based on the use of the nickname addressing the virtual assistant 210.

In some embodiments, messages determined by virtual assistant 210 to be intended for virtual assistant 210 will not be transmitted to the other participant users of the communication session. Likewise, responses provided by virtual assistant 210 can be presented as part of the communication session on client device $115_i$, while not being presented to the other participant users of the communication session. In this way, a user of client device $115_i$ can have a separate conversation with virtual assistant 210 to perform a specified task.

To assist a user with a task, virtual assistant 210 can communicate with one or more computing devices to gather data and perform requested operations. For example, virtual assistant 210 can gather data maintained by client device $115_i$ in memory and/or from other applications on client device $115_i$, such as calendar data, contact data, financial information, etc. Further, virtual assistant 210 can gather data from one or more components of client device $115_i$, such as geographic coordinate data from Global positioning system (GPS) component, temperature data, sound data, etc. Virtual assistant 210 can further edit, modify or delete data, such as creating new calendar entries, modifying contact information, etc.

Virtual assistant 210 can also gather data from one or more computing devices in network communication with client device $115_i$. For example, virtual assistant 210 can communicate with one or more of web servers 120 to request and receive data. For example, virtual assistant 210 can communicate with web servers 120 to gather sports scores, movie show times, driving directions, etc. Further, virtual assistant 210 can perform requested operations, such as purchase movie tickets, login to a user account, provide payment information, etc.

Further, virtual assistant 210 can also gather data from client devices 115. For example, to assist a user in determining the estimated time of arrival of a participant of the communication session, virtual assistant 210 can communicate with a client device $115_j$ of the participant user to gather geographic location data of the user, which can then be used to calculate the estimated time of arrival. In some embodiments, virtual assistant 210 can be required to receive approval from the participant of the communication session prior to receiving data from the participants client device 115. For example, virtual assistant 210 can transmit a message as part of the communication session to the client device $115_j$ requesting the specified data and the receiving participant can select to either approve or deny the request.

In some embodiments, virtual assistant 210 can gather data from content management system 105. For example, virtual assistant 210 can gather data from user accounts maintained by content managements system 105. This can include demographic data for one or more participants of the communication session, contact information, content items assigned to each user, such as applications utilized by each user, etc. In some embodiments, virtual assistant 210 can be required to receive approval from the participant of the communication session prior to being able to access data from the participant's user account. For example, virtual assistant 210 can transmit a message as part of the communication session to the client device $115_j$ requesting approval to access the participant's user account and the receiving participant can select to either approve or deny the request.

Alternatively, a participant can authorize virtual assistant 210 to access their user account by selecting to utilize the virtual assistant with respect to the communication session. Thus, virtual assistant 210 can be automatically authorized to access the user account of each participant of the communication session that has selected to utilize the virtual assistant 210. Virtual assistant 210 can transmit messages requesting approval to access the user account of any participant that has not selected to utilize the personal assistant 210.

In some embodiments, virtual assistant 210 can gather data directly from the participants of a communication session. For example, virtual assistant 210 can present a poll as part of the communication session to gather feedback from the users. This can include presenting the users with multiple options, such as potential restaurants, meeting times, etc. The poll can enable each participant to enter their selection and virtual assistant 210 can select a time, restaurant, etc., based on the provided selections.

In some embodiments, the options presented to the users as part of a poll can be based on data gathered by virtual assistant 210 from the users. For example, to help with the task of selecting a restaurant, the virtual assistant can gather location information from each participant and select restaurants that are nearby or equidistance from the participants. The selected restaurants can then be presented to the users in a poll.

As another example, to assist users schedule a meeting, virtual assistant 210 can gather calendar information from each user to identify a set of candidate times that works best for the participants. Virtual assistant 210 can then present the candidate times to the users as part of the communication session and allow the users to provide feedback.

In some embodiments, virtual assistant 210 can place a temporary hold on the candidate times while the users are providing feedback. The temporary hold will indicate the candidate times as taken or potentially taken until virtual assistant 210 can finalize a time for the meeting. Once virtual assistant 210 finalizes the time for the meeting, the unselected candidate times will no longer be held and the selected candidate time will be scheduled for the meeting.

As another example, to assist a user to perform a financial transaction with one or more other users, virtual assistant 210 can gather data indicating payment methods available to each user and select a set of candidate payment methods that are available to each user. For example, a payment method can be an application that enables a user to transfer money from one party to another. Virtual assistant 210 can determine which payment methods are installed on each user's client device 115 and then present a set of candidate payments methods from which the user can select.

Figure 3:
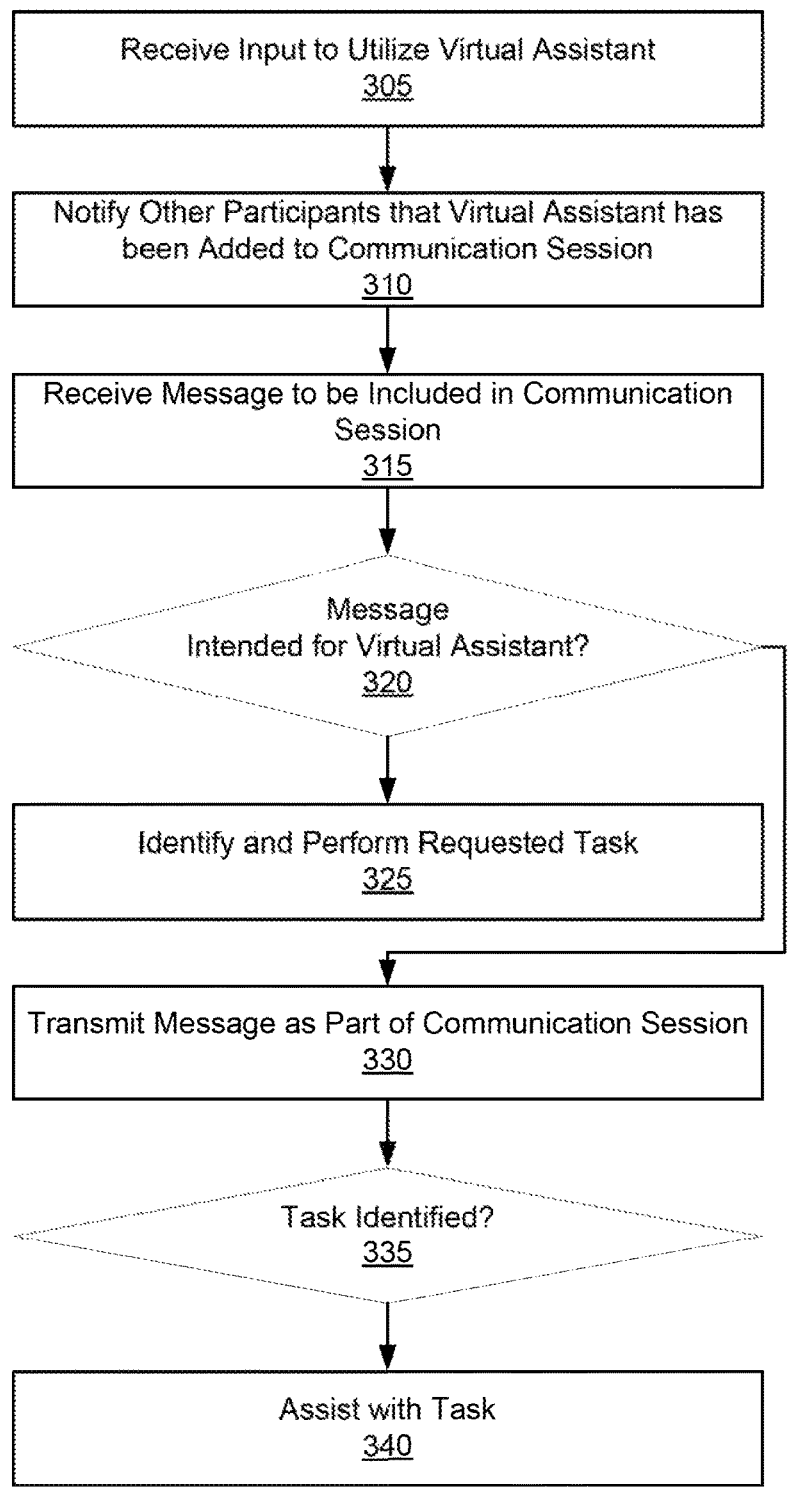
FIG. 3 shows a method of a client device utilizing a virtual assistant to assist with a communication session.

FIG. 3 shows a method of a client device $115_i$ utilizing a virtual assistant 210 to assist with a communication session. The method shown in FIG. 3 is described in view of the systems shown in FIG. 1 and FIG. 2. Although specific steps are shown in FIG. 3, in other embodiments the method may have more or less steps. Further, the order in which the steps are performed is just one possible embodiment and is not meant to be limiting. The method may be performed in a variety of differing orders, including one or more steps being performed simultaneously, and/or including more or less steps than these show in FIG. 2.

At block 305, communication application 205 receives an input indicating that the user of client device $115_i$ would like to utilize virtual assistant 210 to assist with tasks in relation to a specified communication session. For example, the user may have added a nickname associated with virtual assistant 210 as a participant to the communication session. Alternatively, the user may have selected a user interface element indicating that the user would like to utilize virtual assistant 210. In another example, the user can select to utilize virtual assistant 210 by directly addressing virtual assistant 210 in the communication session. For example, the user can enter a message that begins with the a nickname associated with virtual assistant 210, thereby automatically adding virtual assistant 210 to the communication session. In other examples, any other participant of in the communication session can separately confirm and/or consent whether to include virtual assistant 210.

At block 310, communication application 205 can notify the other participant that the virtual assistant is being utilized. For example, the nickname for the personal assistant can be presented as a member of the communication session. Alternatively, communication application 205 can transmit a message to the other participants as part of the communication session that indicates that virtual assistant 210 is being utilized. In some embodiments, the message can prompt the other participants to select to utilize the virtual assistant as well.

At block 315, communication application 205 receives a message to be included in the communication session. For example, a user of client device $115_i$ can enter a message using the communication application.

At block 320, virtual assistant 210 determines whether the message was intended for virtual assistant 210. For example, virtual assistant 210 can use semantic analysis to analyze the message and determine whether the message was intended for virtual assistant 210 or, alternatively, for the other participants of the communication session.

If at block 320, virtual assistant 210 determines that the message was intended for virtual assistant 210, the method continues to block 325. At block 325 the virtual assistant 210 identifies and assists the user with the requested task. The message may not be transmitted to the other recipients of the communication session because it was intended for virtual assistant 210.

Alternatively, if at block 320, virtual assistant 210 determines that the message was not intended for virtual assistant 210 (i.e., the message was intended for the other recipients of the communication session) the method continues to block 330. At block 220 communication application 205 transmits the message as part of the communication session to the other participants of the communication session.

If virtual assistant 210 determines the message is not intended for virtual assistant 210 then at block 335, virtual assistant 210 determines whether there is a task that virtual assistant 210 can assist with. For example, virtual assistant 210 can use semantic analysis to analyze one or more messages included in the communication session to determine whether there is a task that virtual assistant 210 can assist with. If at block 335, virtual assistant identifies a task, the method continues to block 340 where virtual assistant 210 assists the user with the task.

Figure 4A:
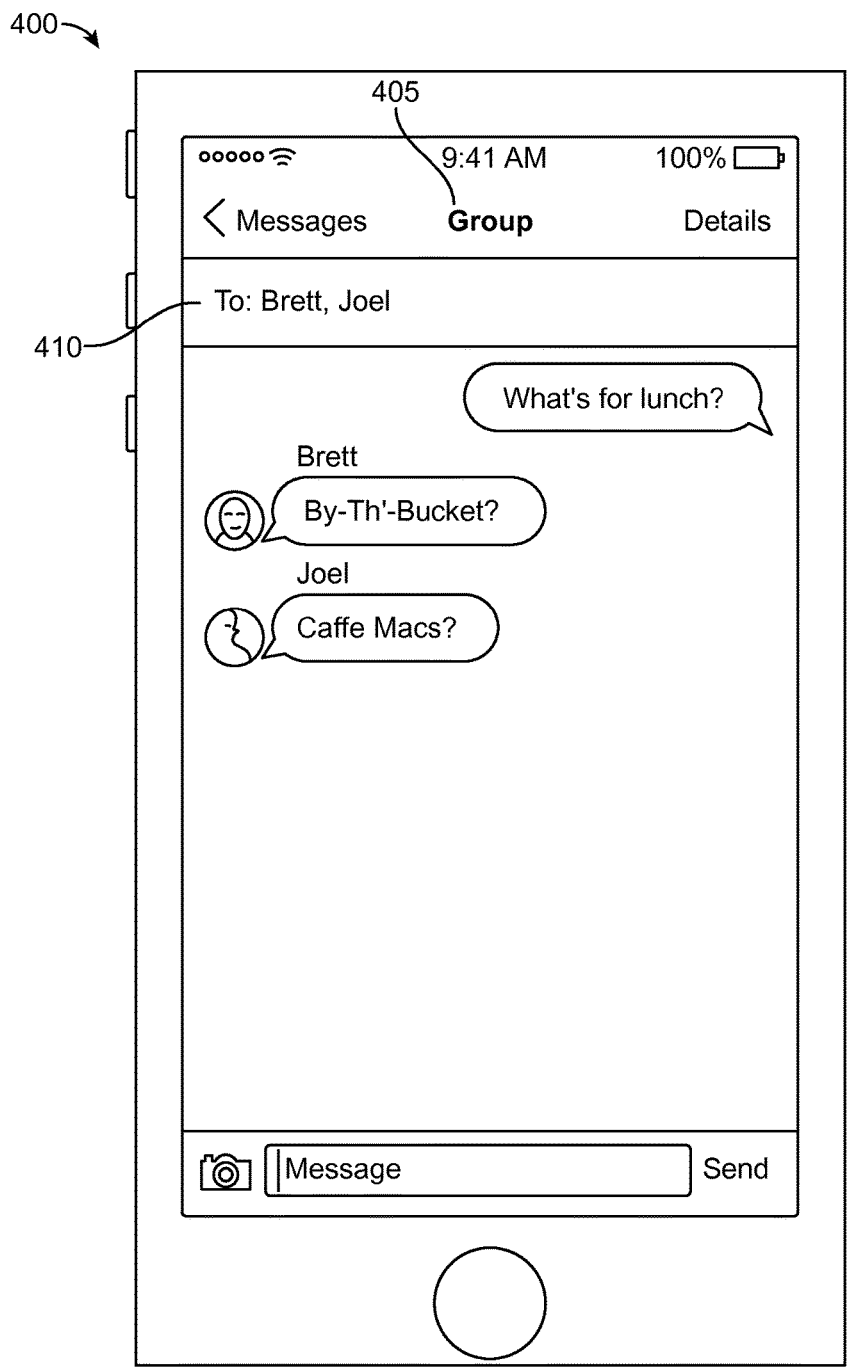
FIGS. 4A-4F shows an example of a virtual assistant assisting a participant of a communication session.

FIG. 4A-4F shows an example of a virtual assistant assisting a participant of a communication session. FIG. 4A shows a client device 400 used to conduct a communication session 405 between multiple participants. As shown the communication session 405 includes a recipient list 410 identifying the participants of the communication session 405 that will receive messages from the user of client device 400. Accordingly, the communication session 405 has three participants: the user of the client device 400, Brett and Joel. The participants are using the communication session 405 to determine where to eat lunch.

Figure 4B:
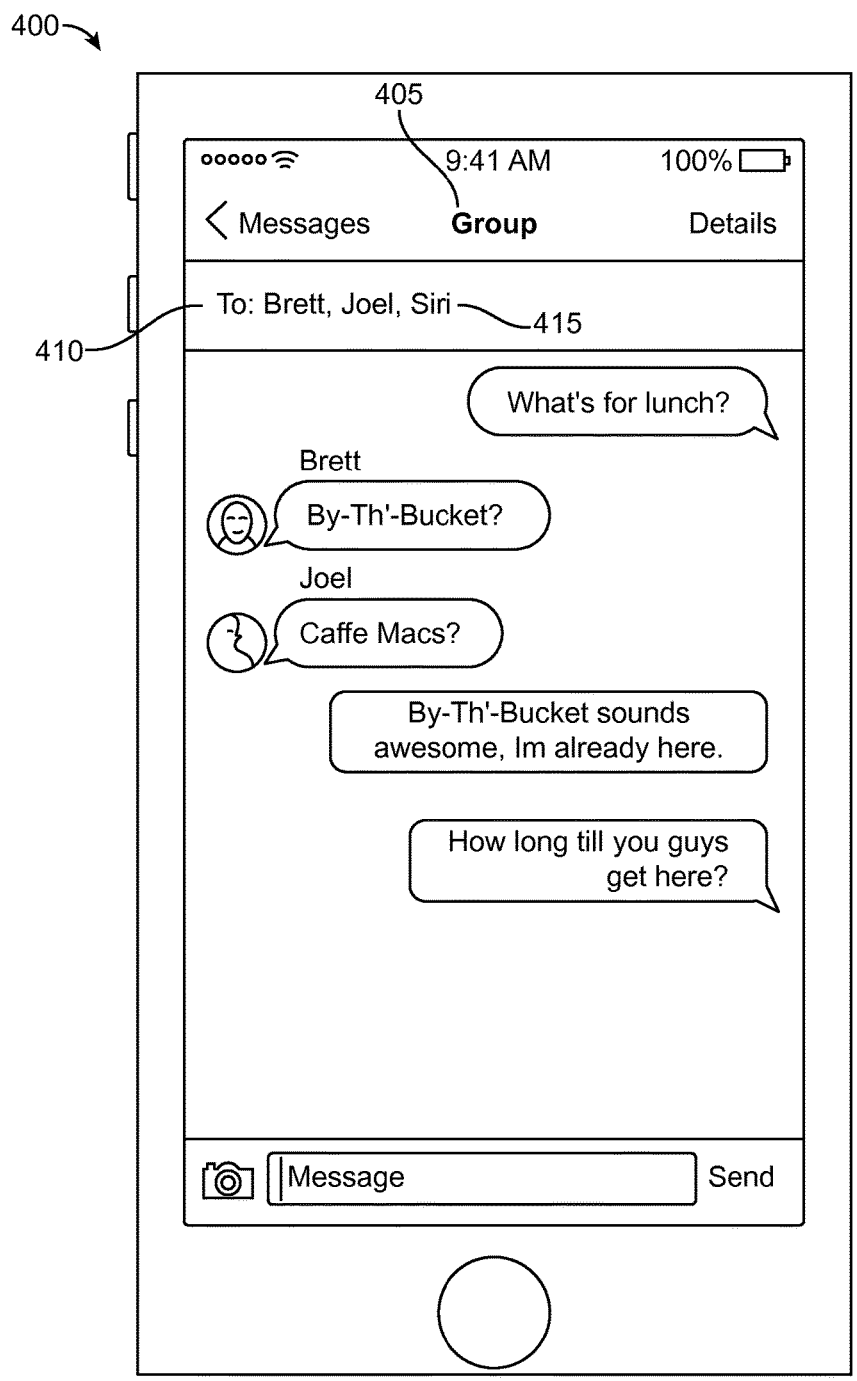

FIG. 4B shows that virtual assistant 415 is included in the recipient list 410, indicating that the user of client device 400 has selected to utilize the virtual assistant in relation to the communication session 405. As shown, the user of the client device 400 has entered the message "how long till you guys get here?"

Figure 4C:
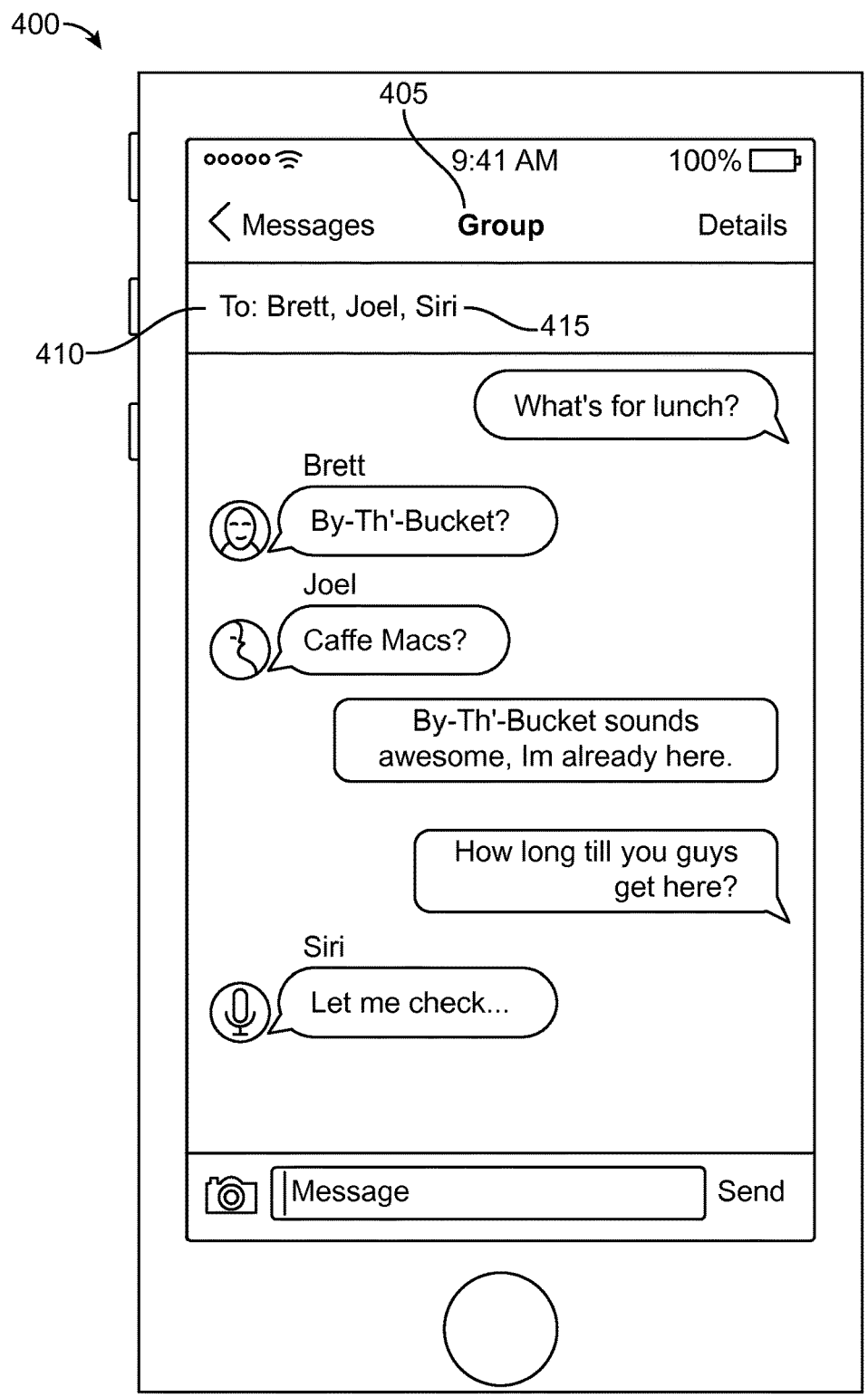

FIG. 4C shows that virtual assistant 415 has presented a message as part of the communication session 405 indicating that the virtual assistant has identified a task and is assisting the user with the identified task. In this case, the task is determining when the other participants of the communication session 405 will arrive at the restaurant for lunch. In some embodiments, the message from virtual assistant 415 can be presented on only the client device 400 and not on the client devices of the other participants of the communication session 405. Alternatively, in some embodiments can be presented on the client device of one or more of the other participants of the communication session 405.

Figure 4D:
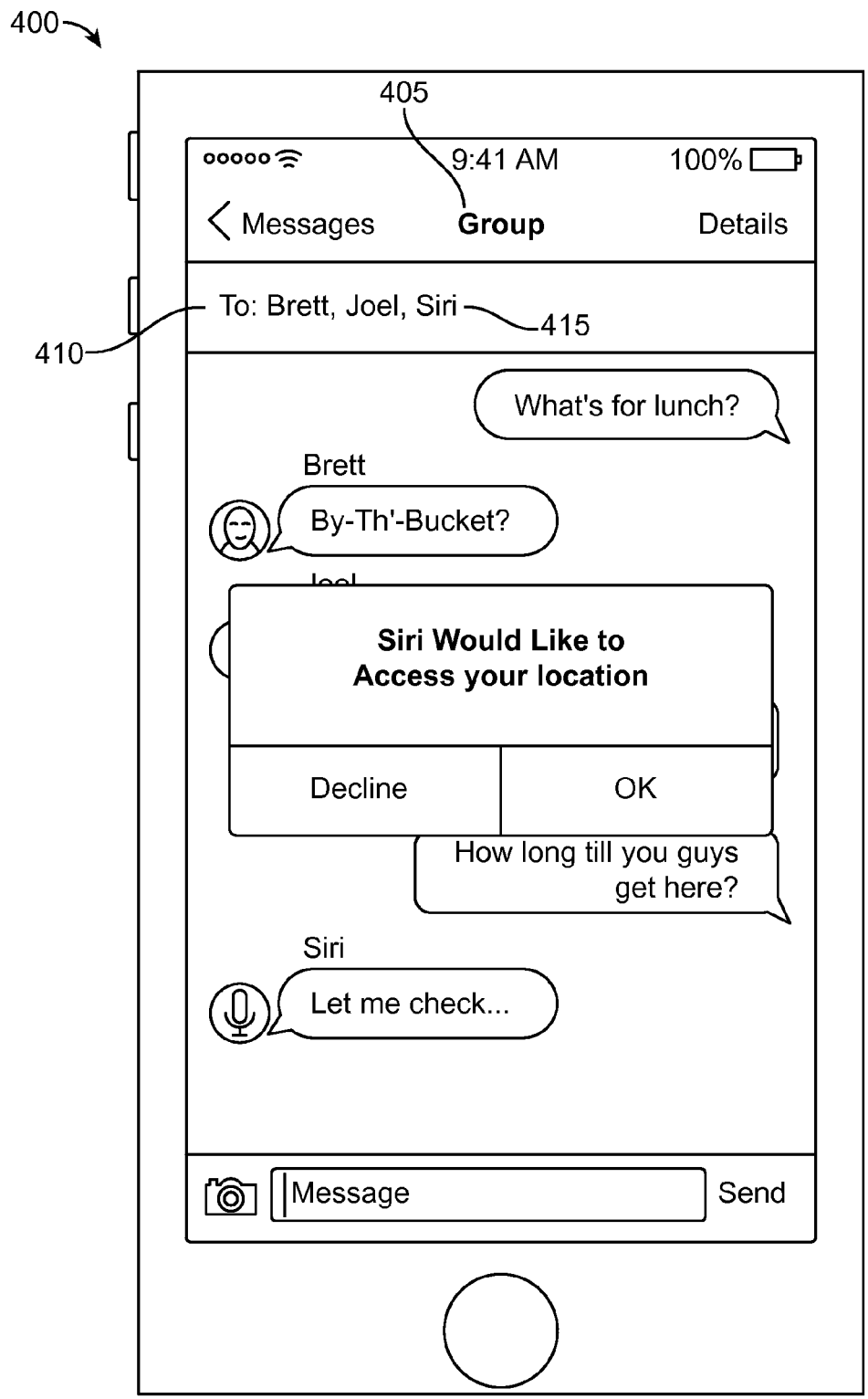

FIG. 4D shows that virtual assistant 415 is requesting authorization to access the location information of the user. This message can be presented to each of the participants of the communication session. If a user selects to decline the authorization request, the virtual assistant will not be able to access the location information of the user. If a user selects to authorize the personal assistant to access the location information of the user, virtual assistant 415 will be able to request and receive the location information. For example, the virtual assistant can request the location information from the users client device. Alternatively, virtual assistant 415 can gather the location information from a content management system that maintains user accounts for the users, such as content management system 105 of FIG. 1.

Figure 4E:
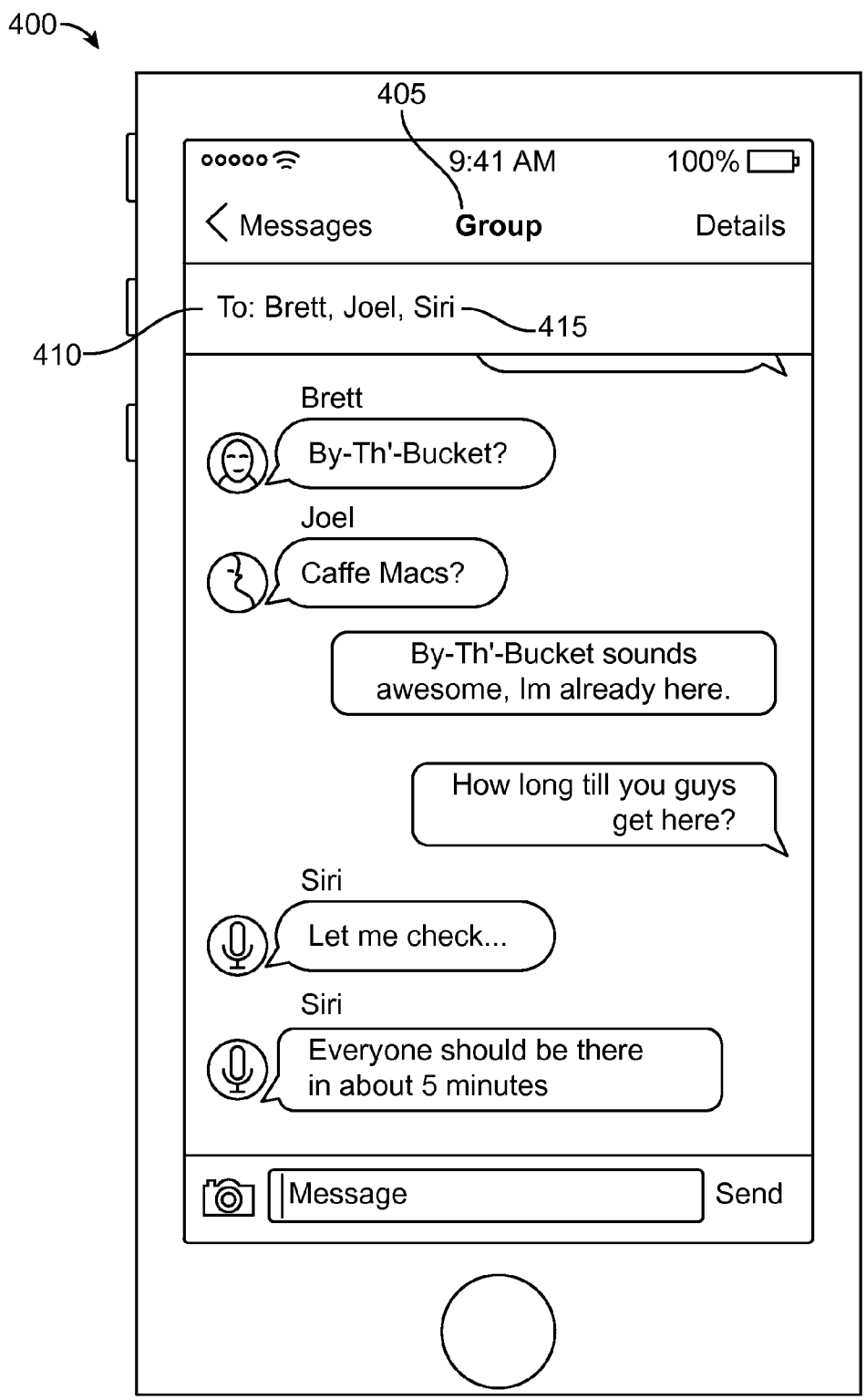

FIG. 4E shows that the virtual assistant 415 has entered a message into the communication session that completes the user's task of determining when the other participants will arrive at the restaurant. The message from virtual assistant 415 can be presented only to the user of the client device 400 as part of the communication session 405. Alternatively, the message from virtual assistant 415 can be presented on the client device of one or more of the other participants of the communication session 405.

Figure 4F:
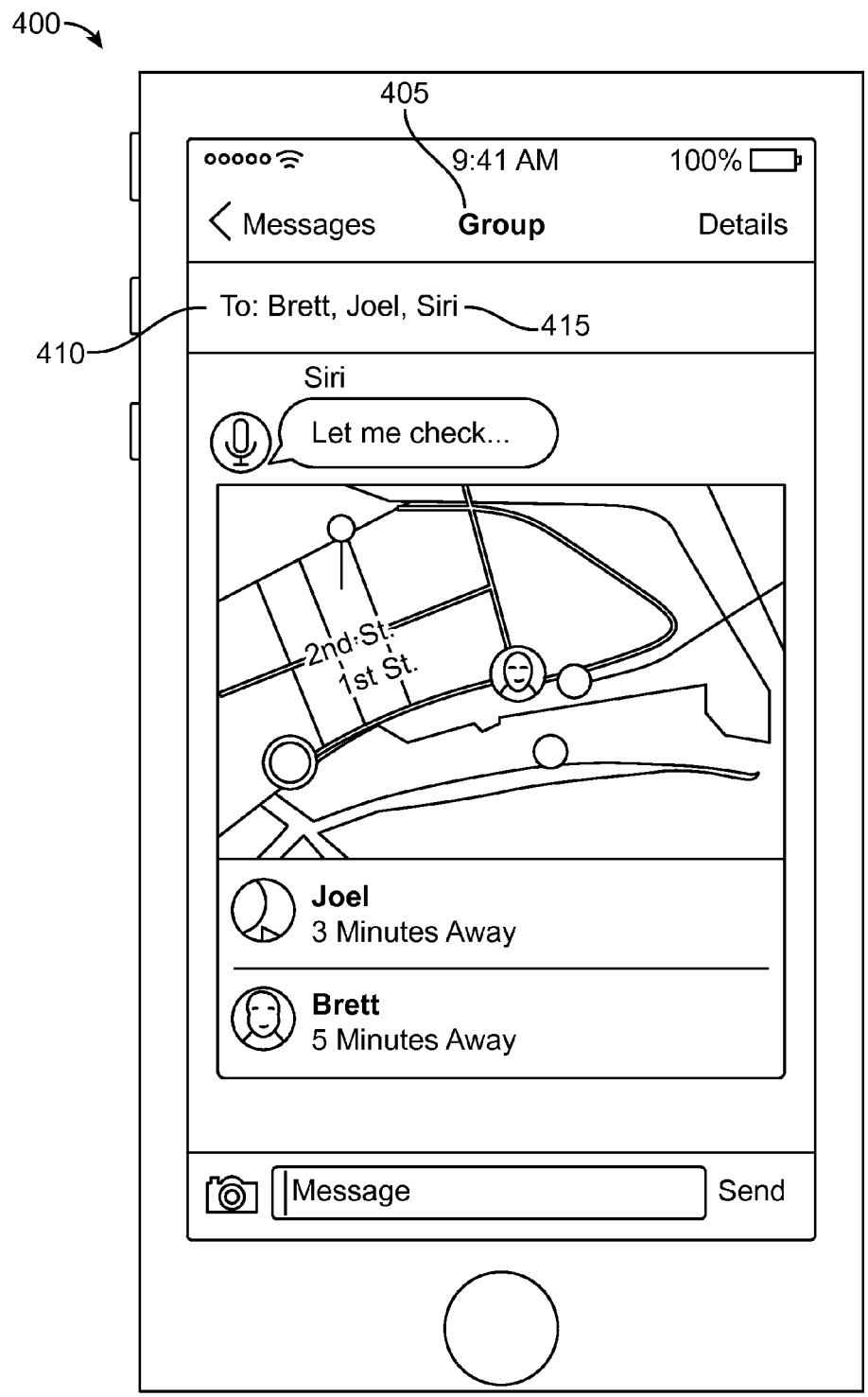

FIG. 4F shows another embodiment of virtual assistant 415 providing the user with the estimated time of arrival of the other participants of the communication session. As shown, a map interface is presented as part of the communication session and the location of the other participants is presented on the map interface.

Figure 5A:
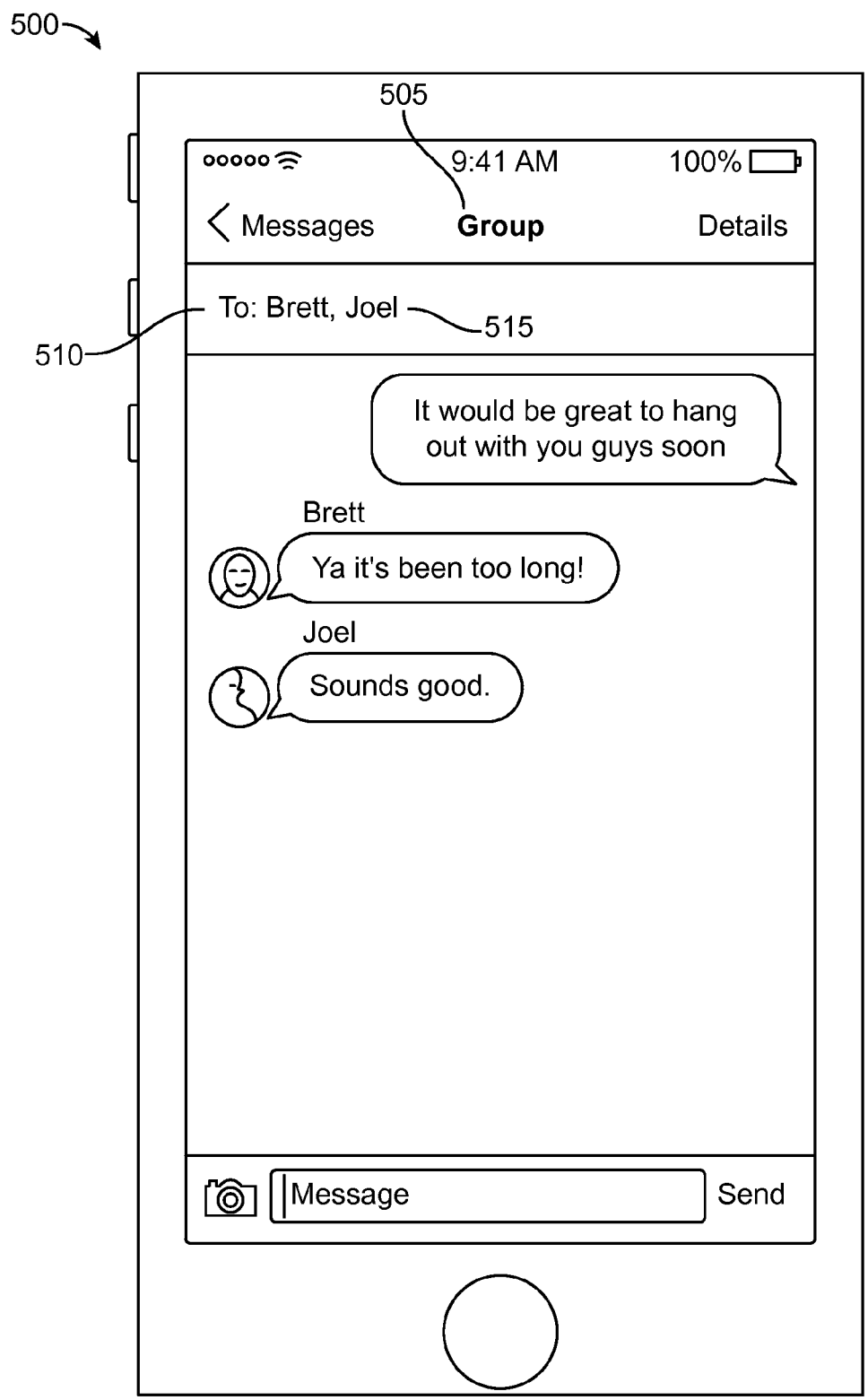
FIGS. 5A-5D show an example of the virtual assistant assisting participants of a communication session to schedule a meeting.

FIGS. 5A-5D show an example of the virtual assistant assisting participants of a communication session to schedule a meeting. As shown in FIG. 5A, a user of a client device 500 is participating in a communication session 505 with two other participants. The participants of a communication session 505 are discussing meeting up to hang out. As shown by the participant list 510, the virtual assistant is not being utilized in relation to the communication session 505.

Figure 5B:
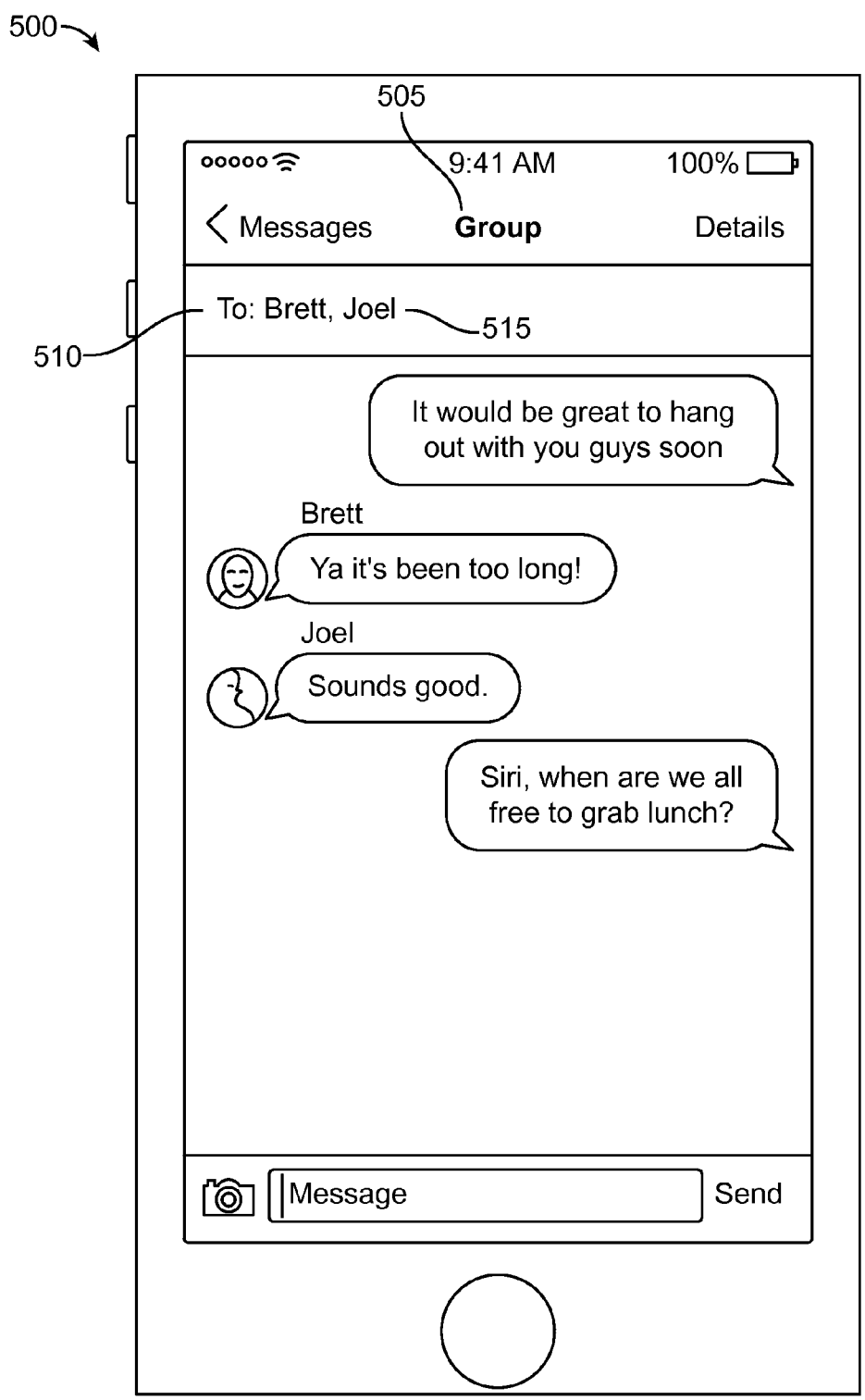

FIG. 5B shows a message entered by the user of client device 500 that is addressed to virtual assistant 515. The message further identifies a task of determining a time when each participant of the communication session 505 is available for lunch. This message can indicate that the user would like to utilize the virtual assistant as well as provide the specified task.

Figure 5C:
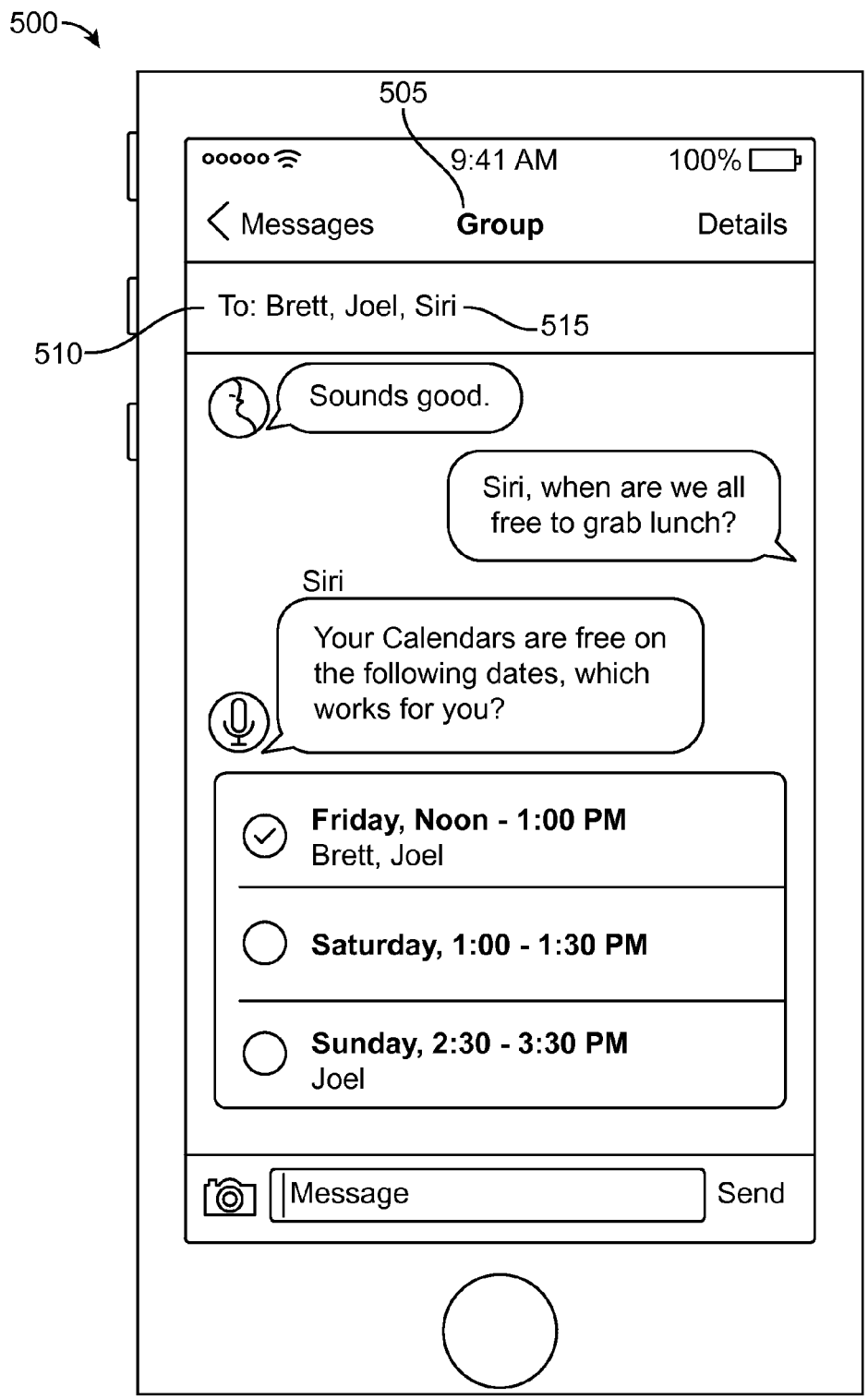

FIG. 5C shows that virtual assistant 515 has been added to the participant list 510 of the communication session 505, indicating that a user has selected to utilize virtual assistant 515. Further, the virtual assistant has presented a poll as part of the communication session 505 that provides the participants with an opportunity to select the time that best works for them. Virtual assistant 515 can determine the presented times based on calendar data gathered from each participant. For example, virtual assistant 515 can gather the calendar data from the client devices of the participants or, alternatively, from a content management system that maintains user accounts for the participants. The presented times can be times at which each of the participants' calendars is not booked (e.g., times at which each participant is free). Further, in some embodiments, virtual assistant 515 can place a temporary hold on each of the participants' calendars for the presented times. This can ensure that the presented times will not be booked while virtual assistant 515 is awaiting responses from the participants. Virtual assistant 515 can place this hold by communicating with the participants' client devices and/or by communicating with the content management system to edit calendar data for the participants. In some embodiments, the temporary hold can be associated with an expiration time after which the temporary hold will be removed if not used to schedule a meeting.

Figure 5D:
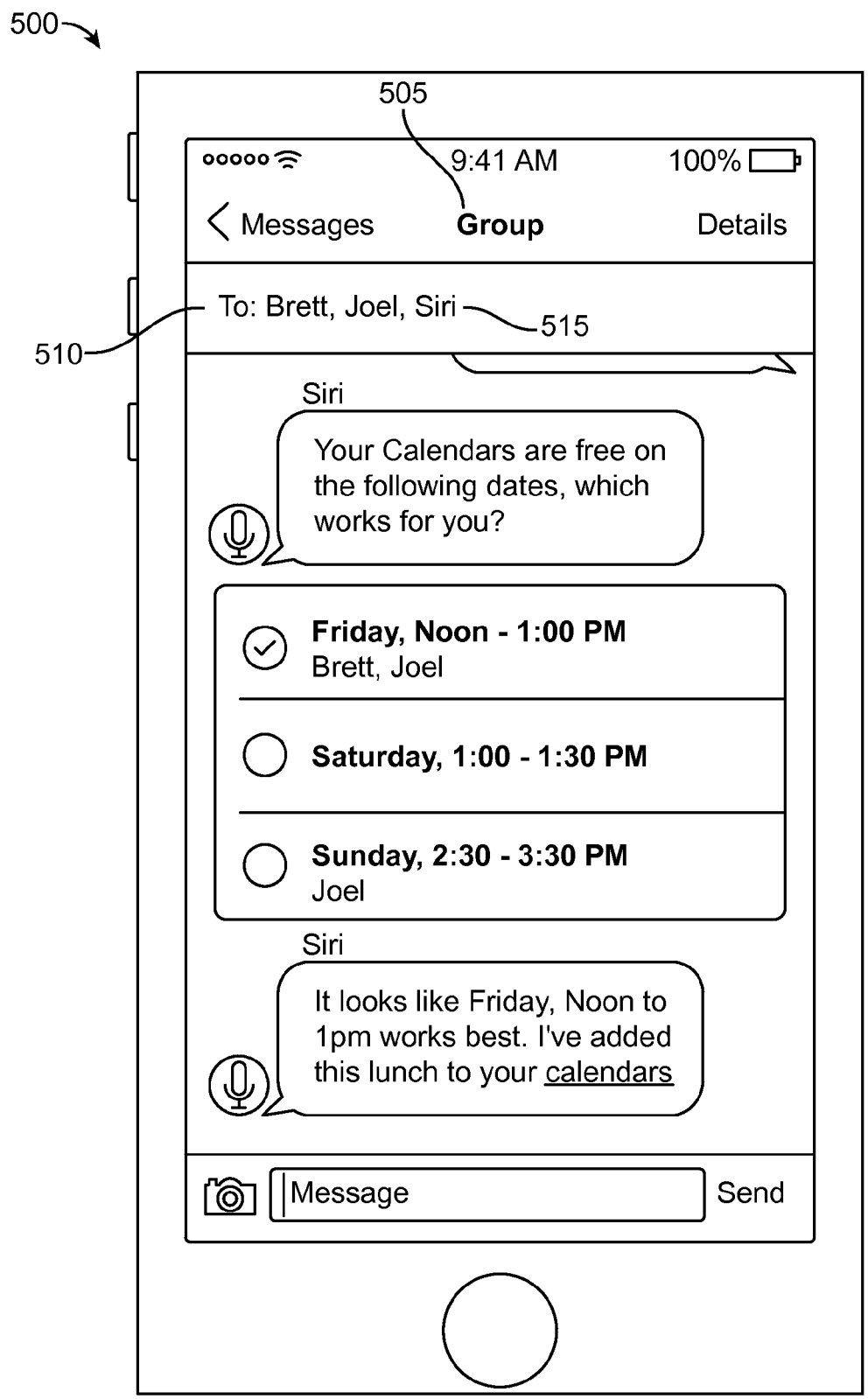

FIG. 5D shows that virtual assistant 515 has determined that Friday from noon to 1 pm is the best time for the meeting and that virtual assistant 515 has added the lunch meeting to the participants' calendars.

Figure 6A:
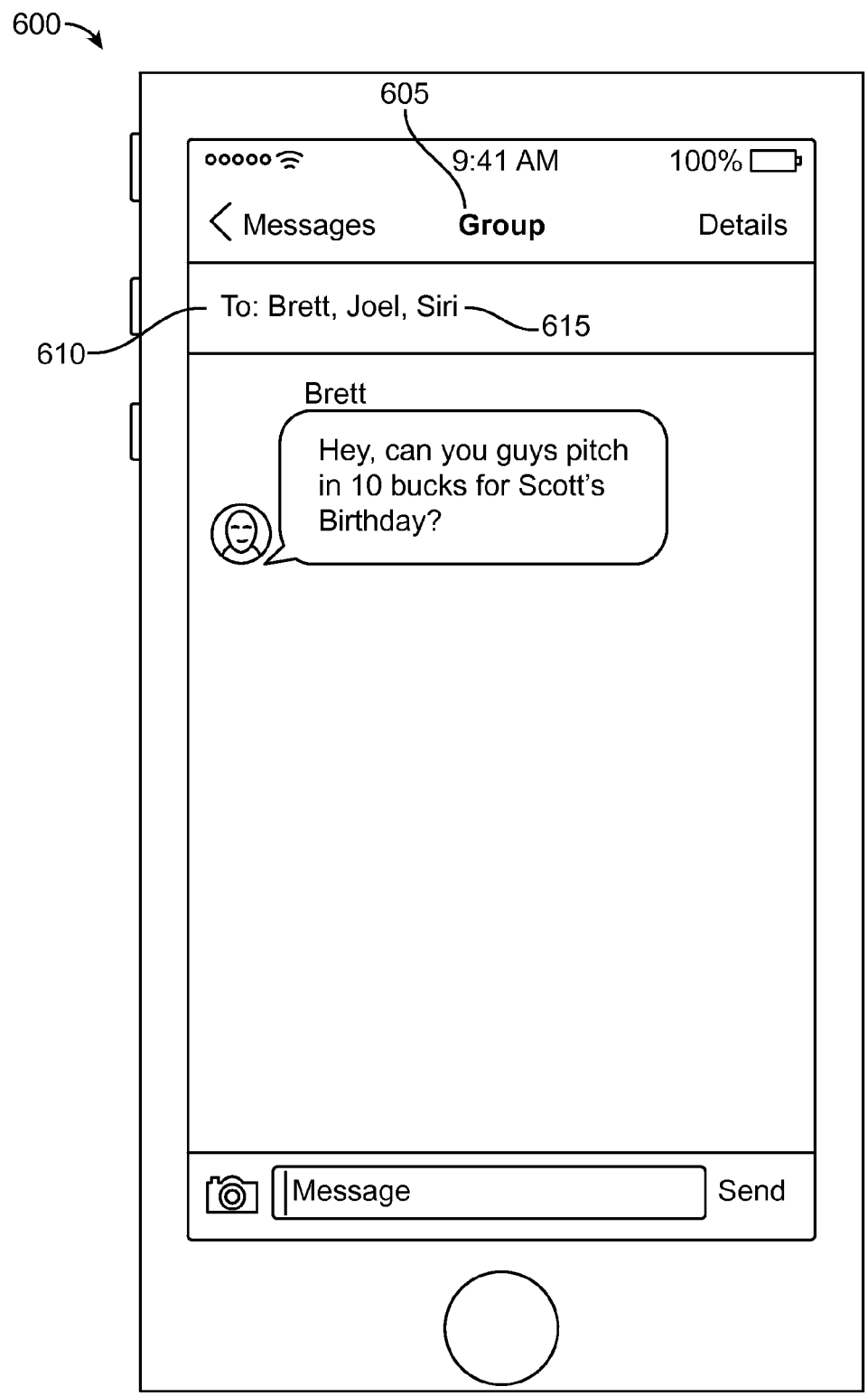
FIGS. 6A-6E show an example of a virtual assistant assisting participants of a communication session to complete a financial transaction.

FIGS. 6A-6E show an example of a virtual assistant assisting participants of a communication session to complete a financial transaction. As shown in FIG. 6A, a user of the client device 600 has received a message as a part of a communication session 605. As indicated by the participant list 610, the virtual assistant is being utilized.

Figure 6B:
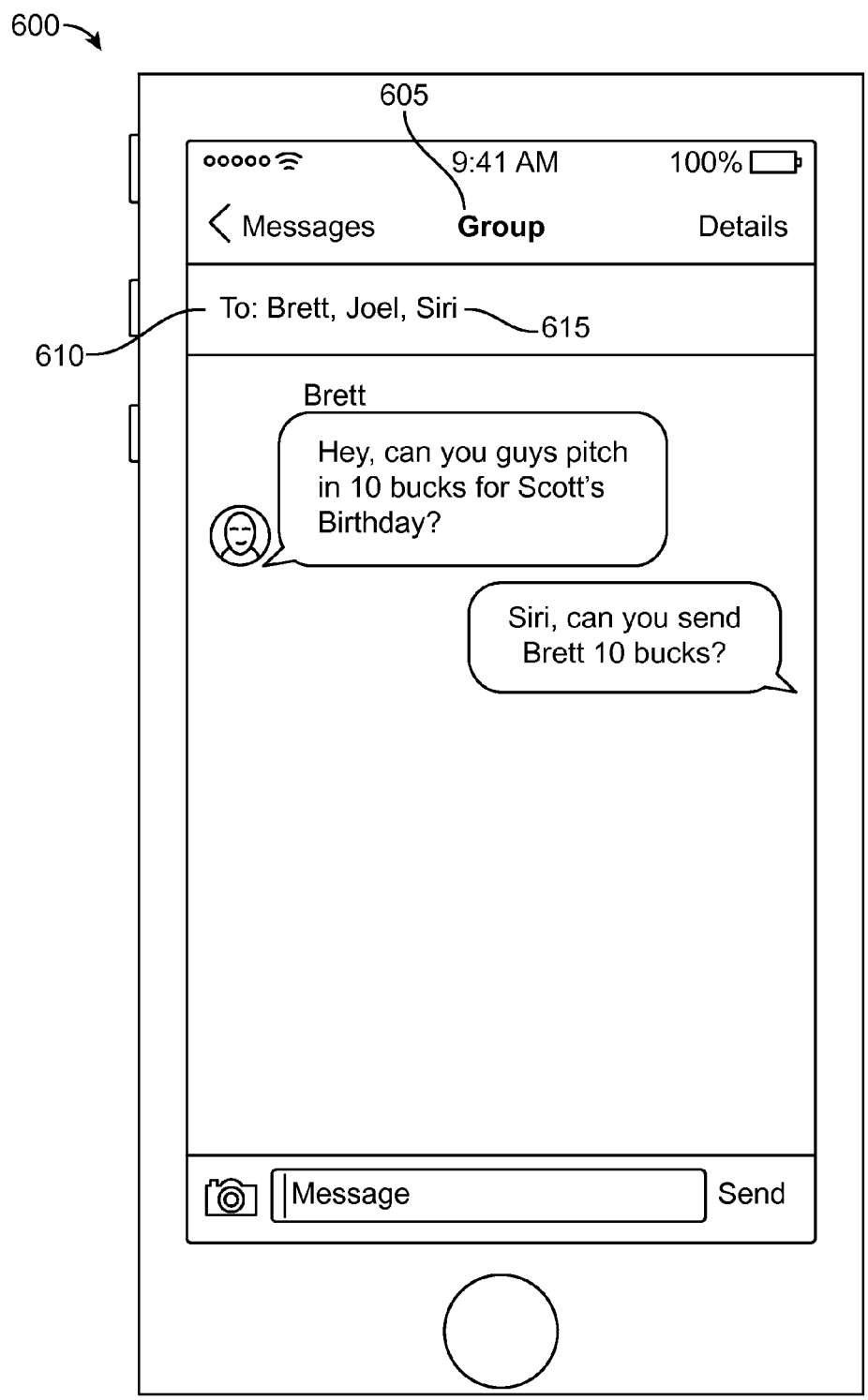
Figure 6C:
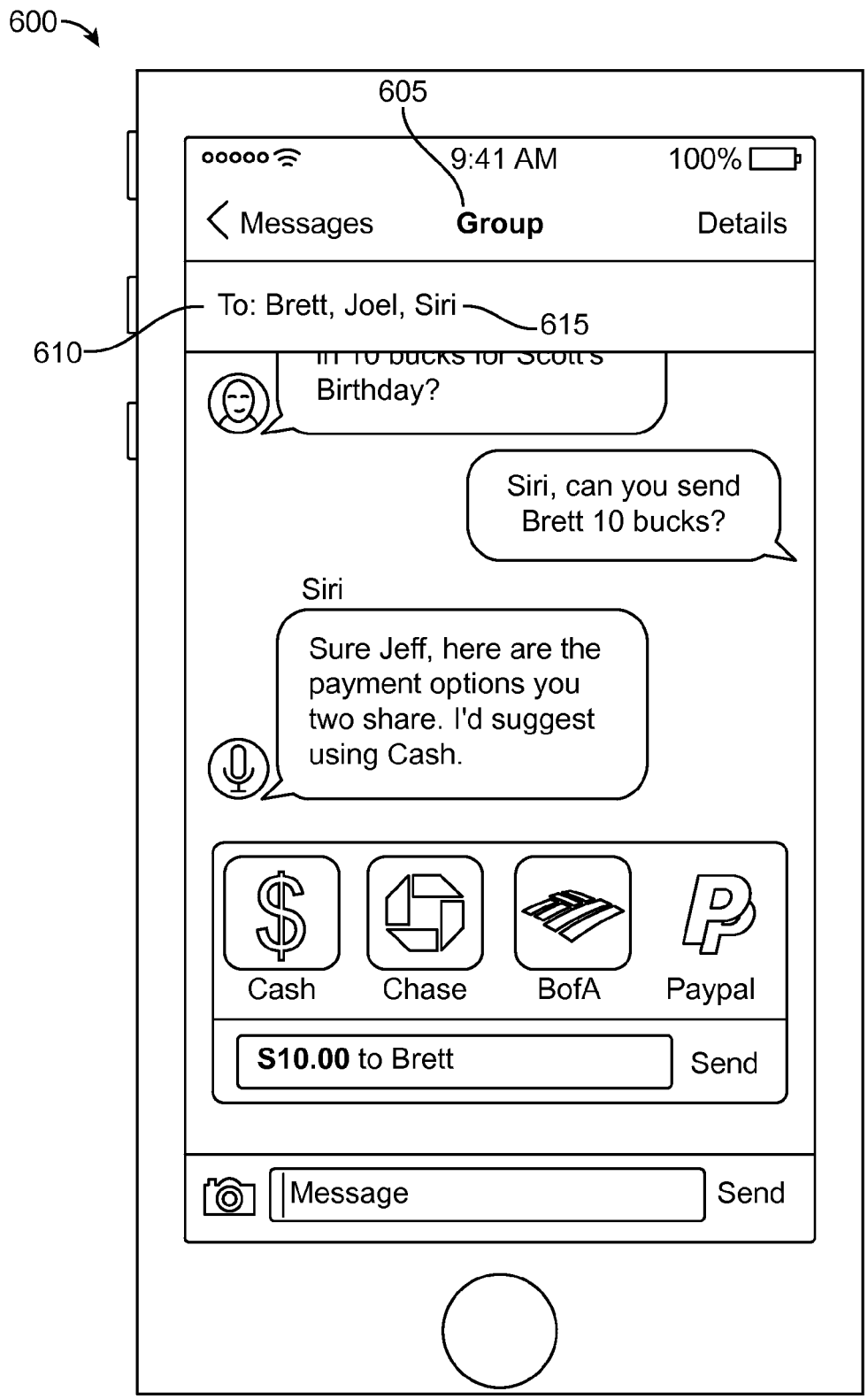

FIG. 6B shows that the user of the client device 600 has entered a message as part of the communication session and that the message is directed to virtual assistant 615. Further, the message requests that virtual assistant 615 send ten dollars to Brett. This message is intended for virtual assistant 615 rather than the other participants of the communication session 605 so the message can be presented on only client device 600 and not shown or presented on the client devices of the other participants.

FIG. 6 shows that virtual assistant 615 has entered a message in response to the user's request. Again, this message can be presented only on the user's client device 600 and not shown to the other participants of the communication session.

As shown, virtual assistant 615 has presented the user with multiple payments options which the user can use to send money. The presented payment options can include financial applications that are available to the user as well as the intended recipient. Virtual assistant 615 can gather data identifying the financial applications that are available to the user and the intended recipient by querying the respective users' client devices and/or communicating with a content management system that maintains user accounts for the respective users.

Virtual assistant 615 also suggests a specific payment option which may be the financial application that is used most commonly by both the user and the intended recipient. The user can select the desired financial application to send the money as well as confirm the payment amount and the intended recipient.

Figure 6D:
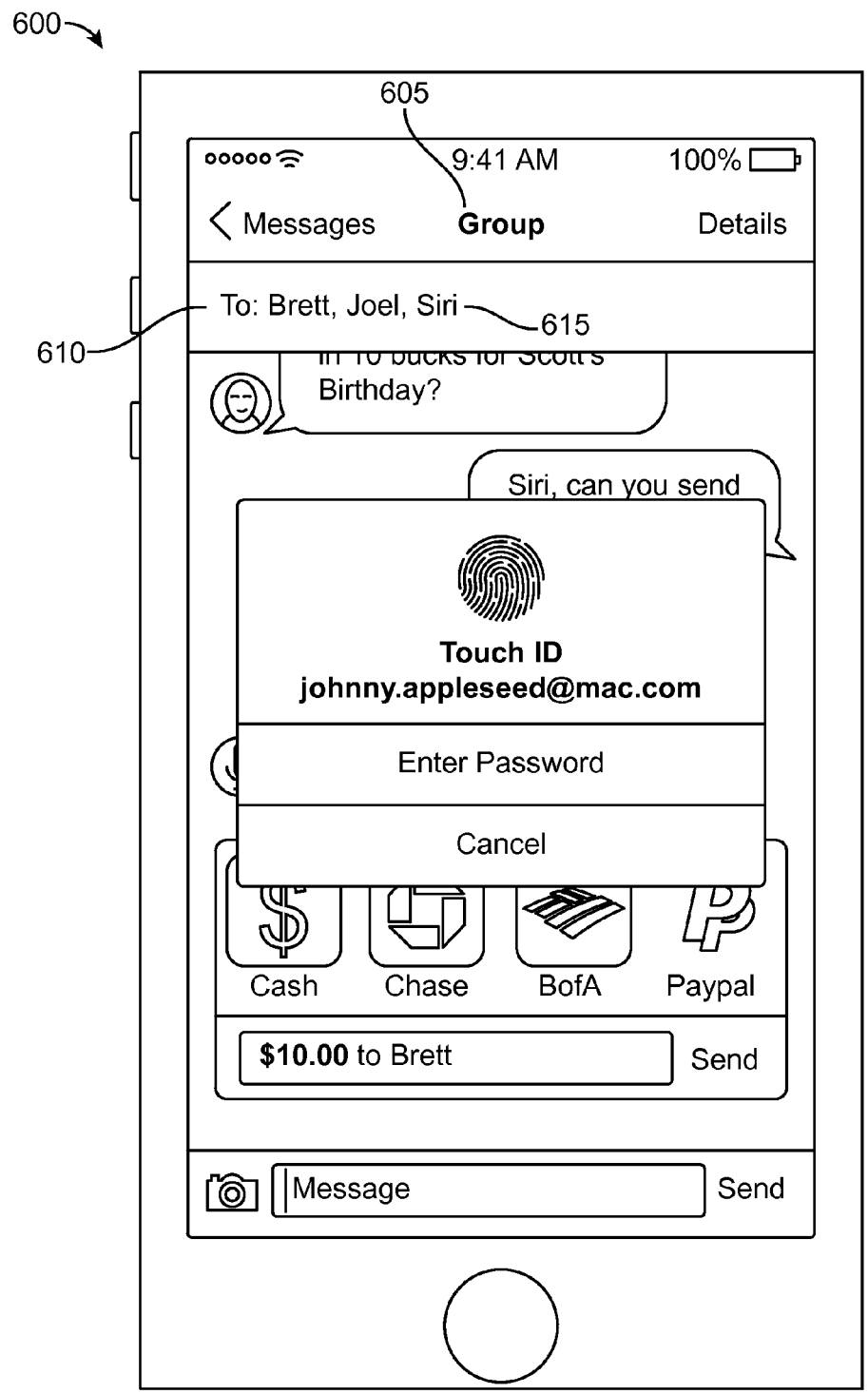

FIG. 6D shows that Virtual assistant 615 can be required to provide authentication information to complete the financial transaction. For example, the user can be required to enter a password, fingerprint, etc.

Figure 6E:
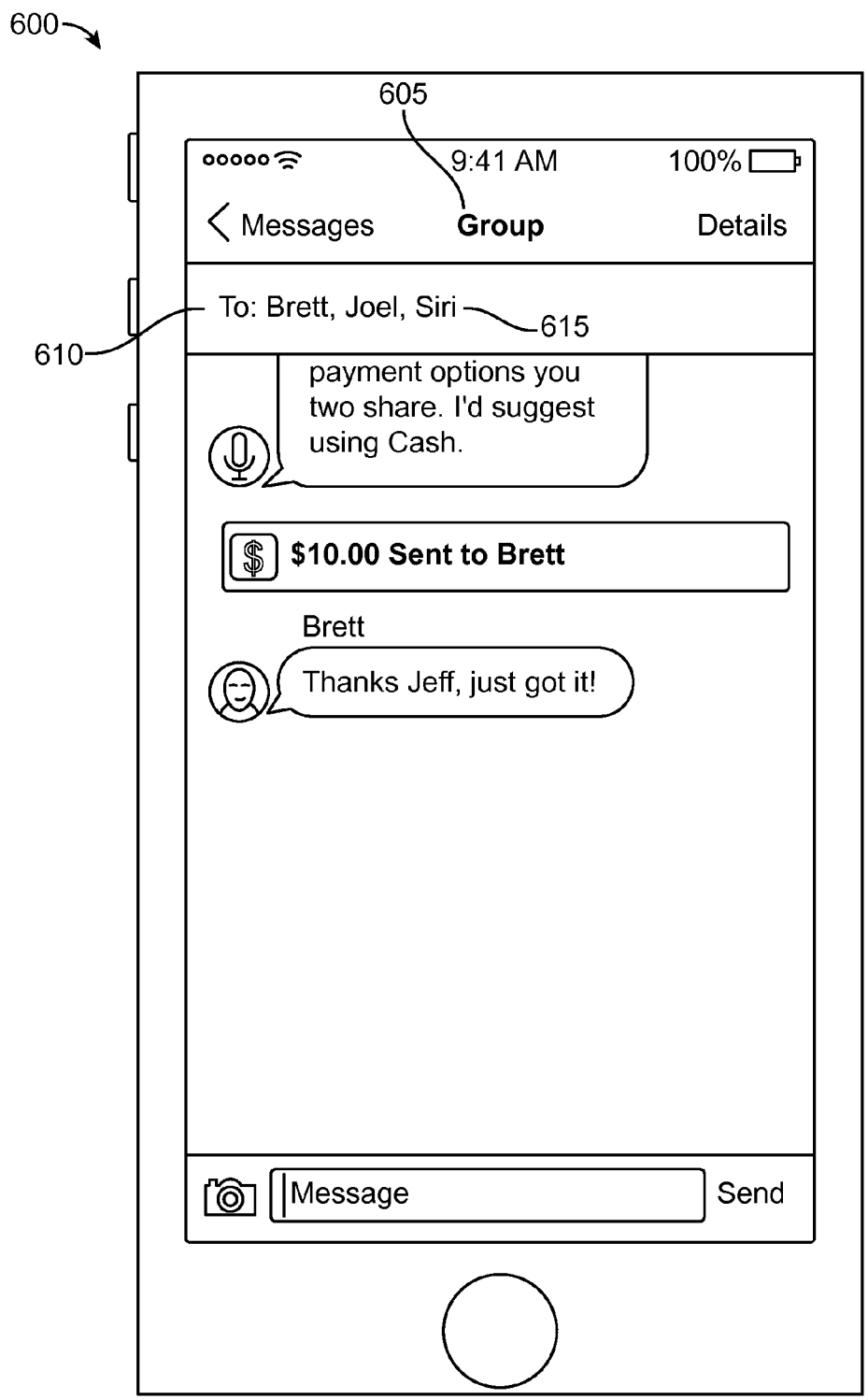

FIG. 6E shows that virtual assistant 615 has presented a message confirming that the funds were transferred as part of the financial transaction. Again, this message can be presented only to the user rather than to the other participants of the communication session 605. Finally, the recipient of the funds has entered a message into the communication session 605 confirming that the funds have been received.

FIG. 7A, and FIG. 7B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 7A illustrates a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
receiving, by a first client device, as part of a communication session that takes place within a text-messaging communication application between a first user operating the first client device and at least a second user, a first message prepared by the first user;
determining, by a virtual assistant of the first client device based on a semantic analysis of the first message, whether the first message is directed to the virtual assistant or to the set of participant users;

determining, by the virtual assistant of the first client device, based on the semantic analysis of the first message, that the first message is directed to the virtual assistant and that the first message identifies a first task with which the virtual assistant can assist the first user; and in response to determining that the first message is directed to the virtual assistant, assisting, by the first client device, the first user with the first task, wherein the first message is displayed within the text-messaging communication application of the first client device and the first message is not transmitted to at least the second user.

2. The method of claim 1, further comprising:

receiving a second message prepared by the first user as part of the communication session;

determining, by the virtual assistant of the first client device, based on a semantic analysis of the second message, whether the second message is directed to the virtual assistant or to the set of participant users:

determining, by the virtual assistant of the first client device, based on the semantic analysis of the second message, that the second message is directed to at least the second user; and in response to determining that the second message is directed to at least the second user, transmitting, by the first client device, the second message to at least the second user as part of the communication session.

3. The method of claim 2, further comprising:

identifying, by the virtual assistant of the first client device, based on the semantic analysis of the second message, a second task with which the virtual assistant can assist the first user; and in response to identifying the second task, assisting, by the virtual assistant of the first client device, the first user with the second task.

4. The method of claim 3, further comprising:

presenting, on the first client device and as part of the communication session, a request message asking the first user whether the first user would like the virtual assistant to assist the first user with the second task; and receiving an input indicating that the first user would like the virtual assistant to assist the first user with the second task.

5. The method of claim 1, further comprising:

transmitting, to a second client device and as part of the communication session, a notification message indicating that the virtual assistant is being utilized in relation to the communication session, wherein the second client device is associated with the second user.

6. The method of claim 1, wherein the first task is performing a financial transaction between the first user and at least the second user.

7. The method of claim 6, further comprising:

identifying, by the virtual assistant of the first client device, a set of financial applications installed on both the first client device and a second client device that are capable of completing the financial transaction, wherein the second client device is associated with the second user;

transmitting, to the second client device, a second message as part of the communication session, the second message prompting the second user to select a financial application from the set of financial applications to complete the financial transaction;

receiving, from the second client device, a first reply message identifying the financial application selected from the set of financial applications selected by the second user to complete the financial transaction; and executing the financial application.

8. A client device comprising:

a computer processor; and a memory containing instructions that, when executed, cause the computer processor to:

receive, as part of a communication session that takes place within a text-messaging communication application between a first user operating the client device and at least a second user, a first message prepared by the first user;

determine, by a virtual assistant of the client device, based on a semantic analysis of the first message, whether the first message is directed to the virtual assistant or to the set of participant users;

determine, by the virtual assistant of the client device, based on the semantic analysis of the first message, that the first message is directed to the virtual assistant and that the first message identifies a first task with which the virtual assistant can assist the first user; and in response to determining that the first message is directed to the virtual assistant, assist the first user with the first task, wherein the first message is a text message displayed within the text-messaging communication application of the client device and the first message is not transmitted to at least the second user.

9. The client device of claim 8, wherein the instructions further cause the computer processor to:

receive a second message prepared by the first user as part of the communication session;

determine, by the virtual assistant of the client device, based on a semantic analysis of the second message, whether the second message is directed to the virtual assistant or to the set of participant users;

determine, by the virtual assistant of the client device, based on the semantic analysis of the second message, that the second message is directed to at least the second user; and in response to determining that the second message is directed to at least the second user, transmit the second message to at least the second user as part of the communication session.

10. The client device of claim 9, wherein the instructions further cause the computer processor to:

identify, by the virtual assistant of the client device, based on the semantic analysis of the second message, a second task with which the virtual assistant can assist the first user; and in response to identifying the second task, assist, by the virtual assistant of the client device, the first user with the second task.

11. The client device of claim 10, wherein the instructions further cause the computer processor to:

present, on the client device and as part of the communication session, a request message asking the first user whether the first user would like the virtual assistant to assist the first user with the second task; and receive an input indicating that the first user would like the virtual assistant to assist the first user with the second task.

12. The client device of claim 8, wherein the instructions further cause the computer processor to:

transmit, to a second client device and as part of the communication session, a notification message indicating that the virtual assistant is being utilized in relation to the communication session, wherein the second client device is associated with the second user.

13. The client device of claim 8, wherein the first task is performing a financial transaction between the first user and at least the second user.

14. The client device of claim 13, wherein the instructions further cause the computer processor to:
 identify, by the virtual assistant of the client device, a set of financial applications installed on both the client device and a second client device that are capable of completing the financial transaction, wherein the second client device is associated with the second user;
 transmit, to the second client device, a second message as part of the communication session, the second message prompting the second user to select a financial application from the set of financial applications to complete the financial transaction;
 receive, from the second client device, a first reply message identifying the financial application selected from the set of financial applications selected by the second user to complete the financial transaction; and
 execute the financial application.

15. A non-transitory computer-readable medium containing instructions that, when executed by a computer processor of a client device, cause the computer processor to:
 receive, as part of a communication session that takes place within a text-messaging communication application between a first user operating the client device and at least a second user, a first message prepared by the first user;
 determine, by a virtual assistant of the client device, based on a semantic analysis of the first message, whether the first message is directed to the virtual assistant or to the set of participant users;
 determine, based on the semantic analysis of the first message, that the first message is directed to the virtual assistant and that the first message identifies a first task with which the virtual assistant can assist the first user; and
 in response to determining that the first message is directed to the virtual assistant, assist the first user with the first task, wherein the first message is a text message displayed within the text-messaging communication application of the client device and the first message is not transmitted to at least the second user.

16. The non-transitory computer-readable medium of claim 15, wherein the instructions further cause the computer processor to:
 receive a second message prepared by the first user as part of the communication session;
 determine, by the virtual assistant of the client device, based on a semantic analysis of the second message, whether the second message is directed to the virtual assistant or to the set of participant users;
 determine, by the virtual assistant of the client device, based on the semantic analysis of the second message, that the second message is directed to at least the second user; and
 in response to determining that the second message is directed to at least the second user, transmit the second message to at least the second user as part of the communication session.

17. The non-transitory computer-readable medium of claim 16, wherein the instructions further cause the computer processor to:
 identify, by the virtual assistant of the client device, based on the semantic analysis of the second message, a second task with which the virtual assistant can assist the first user; and
 in response to identifying the second task, assist, by the virtual assistant of the client device, the first user with the second task.

18. The non-transitory computer-readable medium of claim 17, wherein the instructions further cause the computer processor to:
 present, on the client device and as part of the communication session, a request message asking the first user whether the first user would like the virtual assistant to assist the first user with the second task; and
 receive an input indicating that the first user would like the virtual assistant to assist the first user with the second task.

19. The non-transitory computer-readable medium of claim 15, wherein the instructions further cause the computer processor to:
 transmit, to a second client device and as part of the communication session, a notification message indicating that the virtual assistant is being utilized in relation to the communication session, wherein the second client device is associated with the second user.

20. The non-transitory computer-readable medium of claim 15, wherein the first task is scheduling a meeting including the first user and at least the second user.

21. The non-transitory computer-readable medium of claim 20, wherein the instructions further cause the computer processor to:
 identify, based on calendar data for the first user and at least the second user, a set of candidate times for the meeting;
 place a temporary hold on the set of candidate times, wherein the set of candidate times appear booked in calendars of the first user and at least the second user while the temporary hold is in place;
 present the first user and at least the second user with a poll to select from the set of candidate times, the poll presented as part of the communication session; and
 schedule the meeting during one of the candidate times based on response data received from the first user and at least the second user to the poll.

* * * * *

UNITED STATES PATENT AND TRADEMARK OFFICE
CERTIFICATE OF CORRECTION

PATENT NO. : 10,460,227 B2
APPLICATION NO. : 14/713410
DATED : October 29, 2019
INVENTOR(S) : Mehul K. Sanghavi et al.

Page 1 of 1

It is certified that error appears in the above-identified patent and that said Letters Patent is hereby corrected as shown below:

In the Claims

Column 17, Line 22, In Claim 2, delete "users:" and insert -- users; --, therefor.

Signed and Sealed this
Tenth Day of November, 2020

Andrei Iancu
*Director of the United States Patent and Trademark Office*